(12) United States Patent
Kuntagod et al.

(10) Patent No.: US 11,379,852 B2
(45) Date of Patent: Jul. 5, 2022

(54) AUTHENTICITY IDENTIFICATION SYSTEM

(71) Applicant: Accenture Global Solutions Limited, Dublin (IE)

(72) Inventors: Nataraj Kuntagod, Bangalore (IN); Satya Sai Srinivas, Bangalore (IN); Sanjay Podder, Thane (IN); Vikrant Kaulgud, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 361 days.

(21) Appl. No.: 16/015,985

(22) Filed: Jun. 22, 2018

(65) Prior Publication Data

US 2019/0392457 A1 Dec. 26, 2019

(51) Int. Cl.
*G06Q 30/00* (2012.01)
*G06Q 50/28* (2012.01)
(Continued)

(52) U.S. Cl.
CPC ....... *G06Q 30/018* (2013.01); *G06Q 30/0282* (2013.01); *G06Q 50/28* (2013.01); *G06V 20/20* (2022.01); *H04W 4/02* (2013.01)

(58) Field of Classification Search
CPC ............. G06K 9/00671; G06Q 30/018; G06Q 30/0282; G06Q 50/28; G06Q 10/06375;
(Continued)

(56) References Cited

U.S. PATENT DOCUMENTS

| 2006/0255130 A1* | 11/2006 | Whewell | G07D 7/0043 |
| | | | 235/383 |
| 2013/0122869 A1* | 5/2013 | Falk | H04L 63/0492 |
| | | | 455/411 |
| 2015/0019873 A1* | 1/2015 | Hagemann | B60R 25/2081 |
| | | | 713/186 |

(Continued)

OTHER PUBLICATIONS

Boston379, "Digital Pork: Bringing Blockchain to Wal-Mart China's Supply Chain", RC TOM Challenge 2017, Technology and Operations Management Harvard Business School, Nov. 15, 2017, 6 pages.

(Continued)

*Primary Examiner* — Peter Ludwig
*Assistant Examiner* — Avia Salman
(74) *Attorney, Agent, or Firm* — Jordan IP Law, LLC

(57) ABSTRACT

Systems, apparatuses, and methods directed to authentication. Authentication data may be determined by previous authentications of a plurality of products. Sensor data, related to a first product, may be received. A current authentication of the first product may be executed based on the sensor data and at an authentication device. The execution may include identifying the first product based on the sensor data. The execution may further include identifying whether the current authentication is substantially similar the previous authentications based on whether the first product is substantially similar to the plurality of products. The execution may further include that when the current authentication is identified as not being substantially similar to the one or (Continued)

more of the previous authentications, authenticating the first product according to remote data and the sensor data. Otherwise, the first product may be authenticated according to the authentication data.

16 Claims, 15 Drawing Sheets

(51) Int. Cl.
*H04W 4/02* (2018.01)
*G06Q 30/02* (2012.01)
*G06V 20/20* (2022.01)

(58) Field of Classification Search
CPC ......... G06Q 50/02; H04W 4/02; G06F 16/22; G06F 16/245
See application file for complete search history.

(56) References Cited

U.S. PATENT DOCUMENTS

| | | | |
|---|---|---|---|
| 2015/0127434 A1* | 5/2015 | Davis, Jr. ........... | H04N 7/17318 705/14.5 |
| 2017/0177852 A1* | 6/2017 | Krawczyk ............... | G06F 21/36 |
| 2018/0075546 A1* | 3/2018 | Richt .................... | G06T 1/0007 |

OTHER PUBLICATIONS

Robert Hackett, "Walmart and IBM are Partnering to Put Chinese Pork on a Blockchain", Fortune, Oct. 19, 2016, 4 pages.
Camila Russo, "Walmart is Getting Suppliers to Put Food on the Blockchain", Bloomberg, Apr. 23, 2018, 2 pages.
Spot.tv, "IBM Blockchain TV Commercial, 'Smart Supply Chain'", IBM, 2018, retrieved from www.ispot.tv/ad/doiE/IBM-blockchain-smart-supply-chain#, 3 pages.

\* cited by examiner

View A

View B

View A

View B · View C

AUTHENTICITY IDENTIFICATION SYSTEM

FIELD OF THE DISCLOSURE

This disclosure generally relates to methods, systems, apparatuses, and computer readable media for authentication and verification of products.

BACKGROUND

Some types of products (e.g., agricultural products such as coffee or an animal product such as poultry or milk) may originate with a producer, pass through intermediaries and then be absorbed by an end user. A commodity supply chain may comprise the producer and the intermediaries. In some cases, the supply chain may appear opaque to the end user. For example, the end user may not be able verify assertions or labels with respect to the product, such as whether the product is organic or responsibly sourced.

SUMMARY

Consistent with the disclosure, exemplary embodiments of systems, apparatuses, and methods thereof for reducing driving risks, are disclosed.

According to an embodiment, an authentication system includes one or more remote data sources to store remote data, a storage device to store authentication data, where the authentication data is determined by previous authentications of a plurality of products, and an authentication device coupled to the storage device and the one or more remote data sources. The authentication device may include a display to present a graphical user interface to receive a user input related to a first product. The authentication device may include one or more sensors configured to detect sensor data, where the sensor data is related to the first product. The authentication device may include a processor coupled to the one or more sensors and the display. The processor is to execute a current authentication of the first product based on one or more of the sensor data or the user input. To execute the current authentication, the processor is to identify the first product based on the one or more of the sensor data or the user input, and identify whether the current authentication is substantially similar to one or more of the previous authentications based on whether the first product is substantially similar to one or more of the plurality of products. When the current authentication is identified as not being substantially similar to the one or more of the previous authentications, the processor is to receive the remote data from the one or more remote data sources, and authenticate the first product according to the remote data and the sensor data. When the current authentication is identified as being substantially similar to the one or more of the previous authentications, the processor is to authenticate the first product according to the authentication data from the storage device.

In an embodiment of the system, the storage device is configured to provide the authentication data to the authentication device, and the authentication device includes a local storage that stores the authentication data received from the storage device, where the authentication data includes an authentication score associated with the one or more of the plurality of products. The current authentication is identified as being substantially similar to the one or more of the previous authentications based on the first product being substantially similar to the one or more of the plurality of products. Further, to execute the current authentication, the processor assigns the authentication score to one or more features identified from the sensor data or the user input.

In an embodiment, the system further includes a plurality of remote sensors that is remote to the authentication device and communicatively coupled to the authentication device. The processor is configured to receive remote sensor data from one or more remote sensors that are a subset of the plurality of remote sensors, and when the current authentication is identified as not being substantially similar to the one or more of the previous authentications, authenticate the first product according to the remote sensor data.

In an embodiment, of the system, the authentication device includes an interface configured to identify for each respective sensor among the plurality of remote sensors, a measurement of a communication strength between the authentication device and said each respective sensor, and identify the one or more remote sensors among the plurality of remote sensors based on the measurement of the communication strength between the authentication device and said each respective sensor.

In an embodiment of the system, the processor is configured to identify a plurality of remote data sources that each has a capability to conduct a verification of the one or more of the sensor data or the user input to authenticate the first product, where the plurality of remote data sources includes the one or more remote data sources, identify a first response time of the one or more remote data sources as being shorter than a second response time of at least one other of the plurality of remote data sources, and identify the one or more remote data sources from the plurality of remote data sources in response to the first response time being identified as being shorter than the second response time. When the current authentication is identified as not being substantially similar to the one or more of the previous authentications, the processor is to receive the remote data from the one or more remote data sources but not the at least one other of the plurality of remote data sources.

In an embodiment, an apparatus includes an interface to receive sensor data from one or more sensors, where the sensor data is related to a first product, and a processor is communicatively coupled to a storage device and the interface. The processor is to execute a current authentication of the first product based on the sensor data. The storage device is to store authentication data that is determined by previous authentications of a plurality of products. To execute the current authentication, the processor is to identify the first product based on the sensor data, and identify whether the current authentication is substantially similar to one or more of the previous authentications based on whether the first product is substantially similar to one or more of the plurality of products. When the current authentication is identified as not being substantially similar to the one or more of the previous authentications, the processor is to receive remote data from one or more remote data sources, and authenticate the first product according to the remote data and the sensor data. When the current authentication is identified as being substantially similar to the one or more of the previous authentications, the processor is to authenticate the first product according to the authentication data from the storage device.

In an embodiment of the apparatus, the authentication data includes an authentication score associated with the one or more of the plurality of products. The current authentication is identified as being substantially similar to the one or more of the previous authentications based on the first product being substantially similar to the one or more of the plurality of products. To execute the current authentication, the processor assigns the authentication score to one or more features identified from the sensor data.

In an embodiment of the apparatus, a plurality of remote sensors is remote to the apparatus and communicatively coupled to the apparatus. The processor is to receive remote sensor data from one or more remote sensors that are a subset of the plurality of remote sensors, and when the current authentication is identified as not being substantially similar to the one or more of the previous authentications, authenticate the first product according to the remote sensor data.

In an embodiment of the apparatus, the interface is to identify for each respective sensor among the plurality of remote sensors, a measurement of a communication strength between the apparatus and said each respective sensor and identify the one or more remote sensors among the plurality of remote sensors based on the measurement of the communication strength between the apparatus and said each respective sensor.

In an embodiment of the apparatus, the processor is configured to identify a plurality of remote data sources that each has a capability to conduct a verification of the sensor data to authenticate the first product, where the plurality of remote data sources includes the one or more remote data sources, and identify a first response time of the one or more remote data sources as being shorter than a second response time of at least one other of the plurality of remote data sources. The processor may further be configured to identify the one or more remote data sources from the plurality of remote data sources in response to the first response time being identified as being shorter than the second response time, and when the current authentication is identified as not being substantially similar to the one or more of the previous authentications, receive the remote data from the one or more remote data sources but not the at least one other of the plurality of remote data sources.

In an embodiment, a method includes identifying a storage device that stores authentication data, where the authentication data is determined by previous authentications of a plurality of products. The method may further include receiving sensor data from one or more sensors, where the sensor data is related to a first product, and executing a current authentication of the first product based on the sensor data and at an authentication device. The executing may include identifying the first product based on the sensor data, and identifying whether the current authentication is substantially similar to one or more of the previous authentications based on whether the first product is substantially similar to one or more of the plurality of products. When the current authentication is identified as not being substantially similar to the one or more of the previous authentications, the method may include receiving remote data from one or more remote data sources, and authenticating the first product according to the remote data and the sensor data. When the current authentication is identified as being substantially similar to the one or more of the previous authentications, the method may include authenticating the first product according to the authentication data.

In an embodiment of the method, the authentication data includes an authentication score associated with the one or more of the plurality of products. Further, the identifying whether the current authentication is substantially similar to the one or more of the previous authentications includes identifying that the current authentication is substantially similar to the one or more of the previous authentications based on the first product being substantially similar to the one or more of the plurality of products. The authenticating the first product according to the authentication data includes assigning the authentication score to one or more features identified from the sensor data.

In an embodiment, the method may further include identifying a plurality of remote sensors that is remote to the authentication device and communicatively coupled to the authentication device, receiving remote sensor data from one or more remote sensors that are a subset of the plurality of remote sensors, and when the current authentication is identified as not being substantially similar to the one or more of the previous authentications, authenticating the first product according to the remote sensor data.

In an embodiment, the method further includes identifying for each respective sensor among the plurality of remote sensors, a measurement of a communication strength between the authentication device and said each respective sensor, and identifying the one or more remote sensors among the plurality of remote sensors based on the measurement of the communication strength between the authentication device and said each respective sensor.

In an embodiment, the method further includes identifying a plurality of remote data sources that each has a capability to conduct a verification of the sensor data to authenticate the first product, where the plurality of remote data sources includes the one or more remote data sources and identifying a first response time of the one or more remote data sources as being shorter than a second response time of at least one other of the plurality of remote data sources. The method may further include identifying the one or more remote data sources from the plurality of remote data sources in response to the first response time being identified as being shorter than the second response time, and when the current authentication is identified as not being substantially similar to the one or more of the previous authentications, receiving the remote data from the one or more remote data sources but not the at least one other of the plurality of remote data sources.

In an embodiment, a non-transitory computer readable medium includes a set of instructions, which when executed by one or more processors of an authentication device, cause the one or more processors to identify a storage device that stores authentication data, where the authentication data is determined by previous authentications of a plurality of products, and receive sensor data from one or more sensors, where the sensor data is related to a first product. The one or more processors may further execute a current authentication of the first product based on the sensor data and at the authentication device. The execution by the one or more processors may include an identification of the first product based on the sensor data, and an identification of whether the current authentication is substantially similar to one or more of the previous authentications based on whether the first product is substantially similar to one or more of the plurality of products. When the current authentication is identified as not being substantially similar to the one or more of the previous authentications, the execution by the one or more processors may further include a reception of remote data from one or more remote data sources, and an authentication of the first product according to the remote data and the sensor data. When the current authentication is identified as being substantially similar to the one or more of the previous authentications, the execution by the one or more processors may include an authentication of the first product according to the authentication data.

In an embodiment of the non-transitory computer readable medium, the authentication data includes an authentication score associated with the one or more of the plurality of products, and the one or more processors are to identify that the current authentication is substantially similar to the one or more of the previous authentications based on the first product being substantially similar to the one or more of the plurality of products. The authentication of the first product according to the authentication data includes an assignment of the authentication score to one or more features identified from the sensor data.

In an embodiment of the non-transitory computer readable medium, the one or more processors are to identify a plurality of remote sensors that is remote to the authentication device and communicatively coupled to the authentication device, receive remote sensor data from one or more remote sensors that are a subset of the plurality of remote sensors, and when the current authentication is identified as not being substantially similar to the one or more of the previous authentications, authenticate the first product according to the remote sensor data.

In an embodiment of the non-transitory computer readable medium, the one or more processors are to identify for each respective sensor among the plurality of remote sensors, a measurement of a communication strength between the authentication device and said each respective sensor, and identify the one or more remote sensors among the plurality of remote sensors based on the measurement of the communication strength between the authentication device and said each respective sensor.

In an embodiment of the non-transitory computer readable medium, the one or more processors are to identify a plurality of remote data sources that each has a capability to conduct a verification of the sensor data to authenticate the first product, where the plurality of remote data sources includes the one or more remote data sources, and identify a first response time of the one or more remote data sources as being shorter than a second response time of at least one other of the plurality of remote data sources. The one or more processors are to identify the one or more remote data sources from the plurality of remote data sources in response to the first response time being identified as being shorter than the second response time, and when the current authentication is identified as not being substantially similar to the one or more of the previous authentications, receive the remote data from the one or more remote data sources but not the at least one other of the plurality of remote data sources.

It is to be understood that both the foregoing general description and the following detailed description are exemplary and explanatory only and are not restrictive of the invention, as claimed.

BRIEF DESCRIPTION OF THE DRAWINGS

The various embodiments will become apparent to one skilled in the art by reading the following specification and appended claims, and by referencing the following drawings, in which:

DESCRIPTION OF THE EMBODIMENTS

Figure 1:
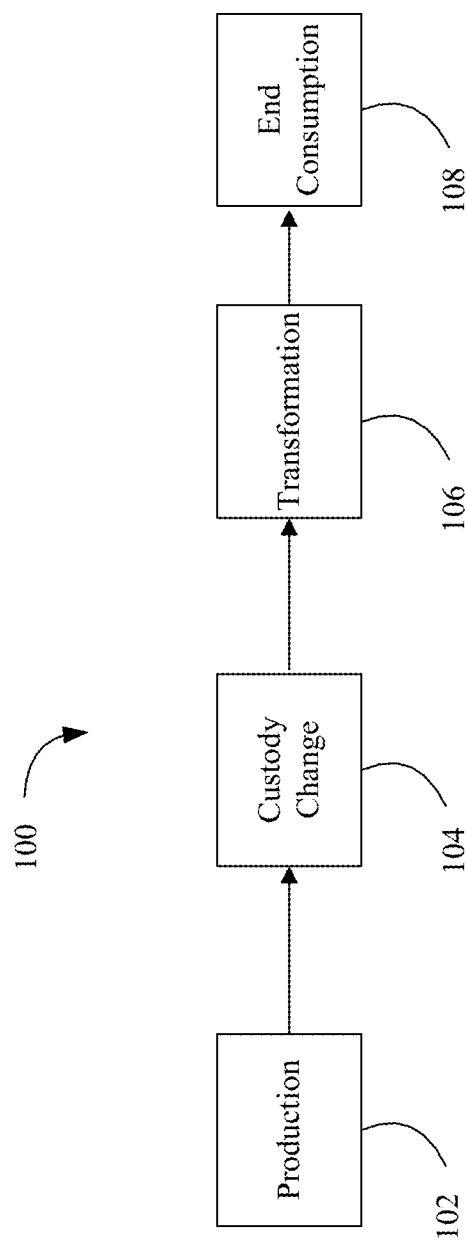
FIG. 1 illustrates a supply chain according to an exemplary embodiment.

While the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," an illustrative embodiment," etc., indicate that the embodiment described may include a particular feature, structure, or characteristic, but every embodiment may or may not necessarily include that particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a machine readable (e.g., computer-readable) medium or machine-readable storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In some cases, it may be possible to remove the commoditization of products in a process known as decommodification. Exemplary products may include agricultural products and animal products, but may be applied to any type of product (e.g., responsibly sourced furniture, computer products, etc.). For example, products may be tagged and tracked through digital tracing techniques to verify that the products are sourced in a particular fashion. Digital tracing enables each individual product to be given a unique identity, and tracked through the entire commodity supply chain. Metadata may be attached to each tagged product at each step of the commodity supply chain, to increase the transparency of the commodity supply chain. The metadata may be verified to ensure that the metadata is accurate. The verification may be based on numerous factors, including natural degradation of the product during the supply chain, transformation of the product throughout the supply chain and so forth.

Therefore, the supply chain may become more transparent and verifiable. For example, consumers or interested parties may simply verify the digital tracing of the product to ensure the product's quality, rather than relying on a wholesaler's verification of a product. Thus, trust may be enhanced.

Moreover, digital tracing of the product may result in more opportunities to execute product differentiation branding. Differentiation may include distinguishing a product from other products, to make the product more attractive to a particular target market. Differentiation may be based on differentiation factors including regional variations, ethical standards and the process followed during production. Differentiation may create barriers for entry into the global supply chain, and result in higher pricing for certain products that are differentiated.

Digital tracing of the product may result in several enhancements, including equal and/or fair pricing models throughout the supply chain, supply chain transparency, product differentiation verification, enhanced trust in the supply chain, identification of weaknesses in the supply chain and granular product tracking. Therefore, higher pricing models and enhanced marketability may be supported through differentiation, enhanced trust in the supply chain and supply chain transparency. If in contrast differentiation is not accurately established (e.g., if authenticity scores are low), pricing models may be automatically adjusted to reflect lowered consumer interest and trust.

Moreover, the digital tracing may result in several technical enhancements. By removing human subjectivity, the supply chain may be accurately assessed. Based on the accurate assessment, the supply chain may be modified to quickly minimize waste, and also enhance quality of the final product. For example, once a weakness is identified in the supply chain, future products may be automatically redirected to avoid/bypass the weakness in the supply chain.

Another technical enhancement may include enabling flexibility in the system as participants are added/removed from the supply chain, while still allowing for transparency and authenticity. For example, if a participant of the supply chain is suddenly no longer able to process a product, and the product is redirected to a replacement, the replacement may be able to quickly and seamlessly enter authenticity data for the product.

Moreover, yet another technical enhancement is faster speed and higher efficiency of the above authentication process, while also conserving computing resources by automatically, dynamically and intelligently selecting the lowest latency data sources needed to validate the product. Yet another technical enhancement may include using a rigorous, computerized process to perform tasks (e.g., an efficient way to authenticate information and enter authenticated information into an accessible format) that were not previously able to be performed by humans in a practical or accurate manner.

Referring to FIG. 1, a product process 100 is illustrated. At production 102 (entry level) a particular product (e.g., coffee) is produced. At production 102, a digital trace may be initiated to track the product. The digital tracing may include assigning a unique digital identifier to the product, and verifying data associated with the product. The digital identifier may be a code that is affixed to the product, and that is also linked to uploaded data. In some embodiments, the digital identifier may include a link to a blockchain that records data of the product, authentication scores of the data and parties that entered the data.

For example, at production 102, a farmer of the product may provide production data of the product. The production data may be verified and assigned authentication scores based on the veracity of the production data. In the example of coffee, the production data may include a type, volume, quality (e.g., percentage of moisture), production method (e.g., organic or non-organic), geographic area of production, favorable atmosphere, altitude, regional variations and/or differentiation factors of the coffee. The production data may be verified to assign product authentication scores to the production data by identifying whether the production data is likely to be accurate. Therefore, different features of the product may be verified through verification of the production data.

For example, if the producer indicates that coffee is being produced, but the producer is located in a region (e.g., Alaska) or at an altitude that is unable to produce coffee (farm land may be verified through positioning sensors and/or land registry), the authentication score may be low. In another example, if the production data indicates that an extremely high amount of coffee is being produced from a small amount of land, the authentication score may be low and as such a yield may be deemed untenable or nearly impossible. Thus, various checks may be applied to the production data.

The production data and product authentication scores may be gathered at the production 102 and linked to the digital identifier. For example, the production data and product authentication scores may be stored in a storage system (e.g., a blockchain or server) and accessed via the digital identifier. An association between the production data, the authentication scores and the producer may be stored in the storage system as well.

At custody change 104, the product may be shipped to a destination. Shipment data (e.g., weight before shipment and after shipment, type of product, source, destination etc.) may be provided by a shipper of the product. The shipper data may be verified to assign shipper authentication scores. The shipper data and the shipper authentication scores may be uploaded to the storage system and linked to the digital identifier. In some embodiments, the digital identifier may be updated as well. An association between the shipper data, the shipper authentication scores and the shipper may be stored in the storage system.

The destination of the product may be a transformation facility to execute processing of the product, which is represented at transformation 106. At transformation 106, the product may be received at the destination and transformed. For example, in the example of coffee, the coffee may be dried, milled and/or roasted. Transformation data (e.g., weight before and after processing, type of product, time spent processing, types of processing, output commodity grade) may be provided by the transformation facility. The transformation data may be verified and assigned transformation authentication scores. The transformation data and the transformation authentication scores may be uploaded to the storage system and linked to the digital identifier. In some embodiments, the digital identifier may be updated as well. An association between the transformation data, the transformation authentication scores and the transformation facility may be stored in the storage system. In some embodiments, there may be several custody changes 104 and transformations 106 that are sequentially linked together successively in time.

End consumption 108 of the product may include the final purchase and sale of the product by a consumer (e.g., an individual or a corporation such as a supermarket). At the end consumption 108, the consumer may quickly identify the entire life cycle of the product through the digital identifier. For example, the digital identifier may be a quick response (QR) code that includes a link (e.g., a public key)

to access the blockchain or storage system to retrieve the data and authentication scores (product, custody and transformation data and authentication scores) associated with the product. The consumer may quickly verify the history of the product through the associated data, verify whether the associated data is accurate via the authentication scores, and determine a final purchase price, or in the alternative, decline to accept the product if the data is deemed untruthful or has low authentication scores. In some embodiments, the digital identifier may include all authentication scores and data.

Figure 2:
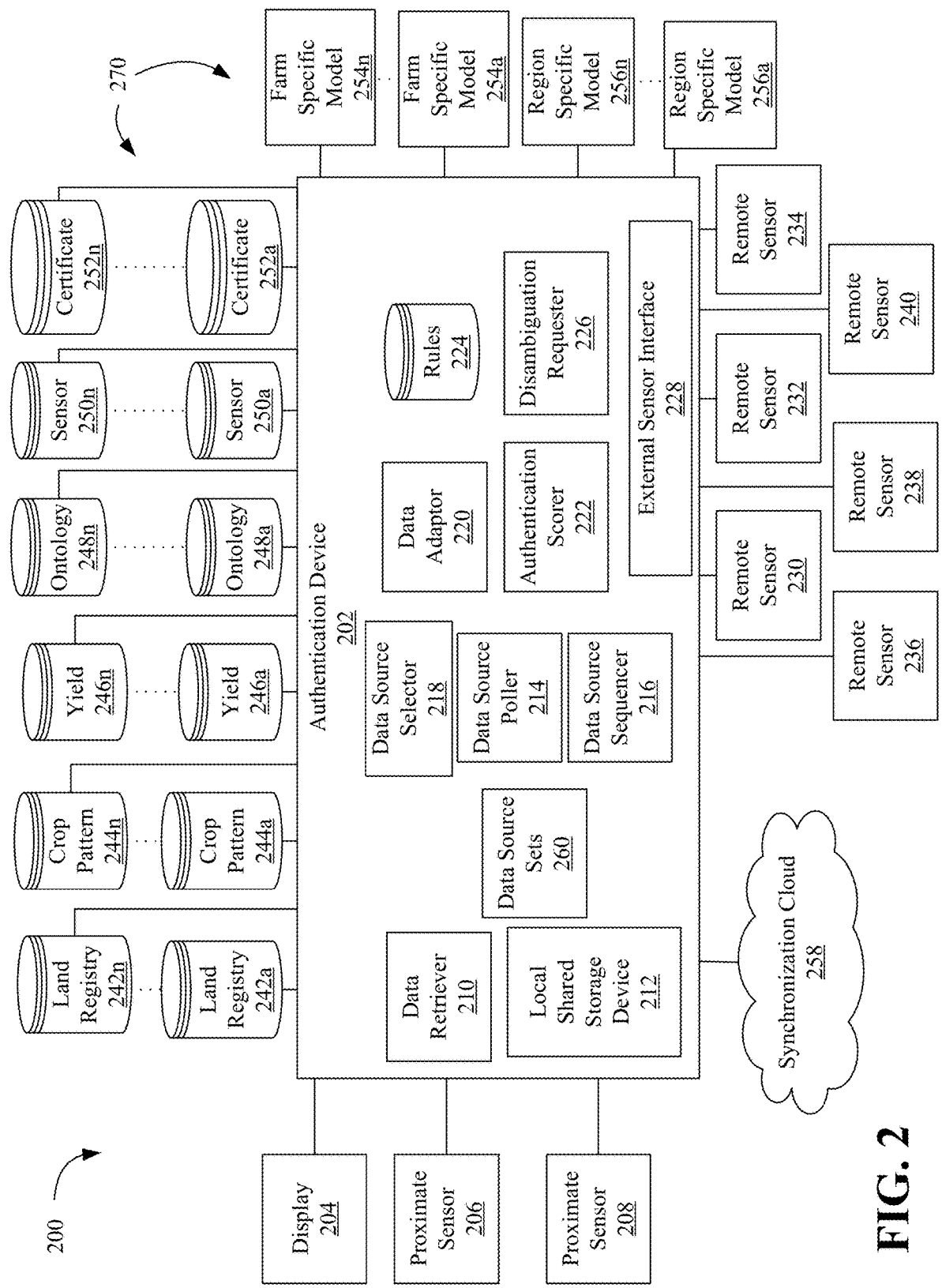
FIG. 2 illustrates a schematic diagram of an overall system architecture according to an exemplary embodiment at an entry level of a product.

Referring to FIG. 2, a system 200 to authenticate a product is provided. The system 200 may be utilized during the production 102 or entry level of a product into the supply chain. The system 200 may include an authentication device 202. The authentication device 202 may be a computing device (e.g., desktop, laptop, mobile phone, server, tablet, etc). In some embodiments, it may be preferable to use a lower processing powered device (e.g., mobile device or tablet) for conservation of resources. The authentication device 202 may be under the direct control of a user. The authentication device 202 may capture data associated with the product, validate the data to generate an authentication score, generate a digital identifier and record the data and the authentication score in a blockchain that is linked to the digital identifier.

The authentication device 202 may be communicatively connected to a display 204, proximate sensor 206 and proximate sensor 208. The user may provide user input through a graphical user interface of the display 204, and sensor data may be captured through the proximate sensors 206, 208 related to the product to be authenticated. The user input may relate to the product, and may include information such as a type of product, quantity, grade of product, third party certifications (e.g., sustainably certified, organic, Rainforest Alliance Certified, Fairtrade Certification, UTZ certified) and weight of the products. In some embodiments, the display 204 and proximate sensors 206, 208 are part of the authentication device 202. In some embodiments, no user input is required and sensor data from the proximate sensors 206, 208 is utilized for authentication of the product. Remote sensors 230-240 may also be utilized in conjunction with the proximate sensors 206, 208 to authenticate the product.

Proximate sensor 206 may include an imaging device, such as a camera, to capture an image of the product to be authenticated. The proximate sensor 208 may include a positioning system, such as a global positioning system (GPS), to provide an approximate location to the authentication device 202. While two proximate sensors 206, 208 are illustrated, more proximate sensors may be provided to capture other information, such as a time that the image was captured by the proximate sensor 206, and/or a weight of the product. Thus, the proximate sensors 206, 208 may capture characteristics of the product. In some embodiments, the external sensor interface 228 may be configured to receive data from the proximate sensors 206, 208 and provide the data to other components described herein.

The authentication device 202 may be communicatively coupled to data sources 270. The data sources 270 may include databases 242-252 and models 254-256. The data sources 270 may host multiple instances of the same data on different third-party devices. The data sources 270 may include data related to verification of the user input and/or the sensor input. For example, land registry data bases 242a-242n may include multiple instances of land registry information. In some embodiments, the land registry databases 242a-242n may include multiple instances of substantially similar data. In some embodiments, the databases 242a-242n may each include some same data, and additionally different data (i.e., at least some of the databases 242a-242n contains some different data from one another but each may include data that may be used for authentication). The other data sources 270 may likewise be configured. The data sources 270 may be servers, computing devices and so forth that store the data of the databases 242-252 and farm specific models 254-256, where each of the databases 242-252 and farm specific models 254-256 are stored on a different server or computing device.

The databases 242-252 may be identified by the data source poller 214 according to the type of data stored by the databases 242-252. The databases 242-252 may further be each identified by the data source poller 214 as including information which may be relevant for authentication processes as described herein. For example, a first type of data is land registry, which is represented by land registry databases 242a-242n. A second type of data is crop pattern, which is represented by crop pattern databases 244a-244n. A third type of data is yield, which is represented by yield databases 246a-246n. A fourth type of data is ontology, which is represented by ontology databases 248a-248n. A fifth type of data is sensor, which is represented by sensor databases 250a-250n. A sixth type of data is certificate, which is represented by certificate databases 252a-252n. A seventh type of data is farmer specific models, which is represented by farm specific models 254a-254n. An eighth type of data is region specific models, which is represented by region specific model data sources 256a-256n.

As described above, each type of the data sources 242-256 may include the same information. For example, each of the land registry databases 242a-242n may include at least some of the same information, and the crop pattern databases 244a-244n includes at some of the same information. In some embodiments, the data sources 242-256 may include the same information and additionally other information that may be different from each other.

The land registry databases 242a-242n may each include information of the registration and the ownership of land (e.g., who owns the land) and property in a region. The crop pattern databases 244a-244n may each include information of the proportion of area under different crops at a particular period of time (e.g., how much area in a region is used to grow coffee). The yield databases 246a-246n may each include information of a measure of the yield of a crop per unit area of land cultivation, and/or the seed generation of the plant itself (e.g. if three grains are harvested for each grain seeded, the resulting yield is 1:3). The ontology databases 248a-248n may include information that defines products attributes and differentiation metadata for a specified product. Sensor databases 250a-250n may include information relating to different types of sensors that may be used to authenticate different product attributes. For example only certain types of sensors may be used to validate a specific product attribute. The certificate databases 252a-252n may include information relating to different types of certificates as mentioned above. The farm specific models 254a-254n may provide individual information relating to specific farms (e.g., typical farm specific yield and output as well as typical crop farm type). The region specific models 256a-256n may include data relating to a region as a whole (e.g., typical regional yield and output as well as typical crop regional type), and may include particular data relating to surrounding farms.

The network connection (e.g., an internet service provider) of the authentication device 202 to communicate with the data sources 270 may prefer one or more of the data sources 270. For example, a certain internet provider may enforce a policy to direct users towards particular ones of the data sources 270. Thus, two identical authentication devices 202 in a same general vicinity and that have different internet service providers may identify different data sources 270 as having the lowest latencies for the same crop in the same region.

A data source poller 214 may be a context specific device to enhance response times for the individual authentication device 202 in view of the foregoing. In detail, the data source poller 214 may be a background service that continuously polls multiple instances of the databases 242a-252n and models 254a-256n and identifies latencies (i.e., response times) for each of the databases 242a-252n and models 254a-256n. In some embodiments, the data source poller 214 may identify data sources from the data sources 270 with the lowest latencies according to the data source 270 type. For example, the data source poller 214 may identify a lowest latency database from the land registry databases 242a-242n, and then identify a lowest latency database from the crop pattern databases 244a-244n and so forth until a lowest latency database is identified for each database type, and a lowest latency model is identified for each model source type. In some embodiments, the data source poller 214 may identify the lowest latency databases based on a region and type of product (e.g., a type of crop and subtype) which may be authenticated.

In some embodiments, the data source poller 214 may control a data structure (e.g., lookup table or array). The data source poller 214 may identify a latency of each of the data sources 270, and in some embodiments may insert the latencies into the data structure for reference. The latencies may further be linked to the associated data sources 270 so that a latency of a particular one of the data sources 270 may be identified as being a lowest latency data source. For example, a first entry may include land registry database 242a in association with the identified latency (e.g., 1 ms) of the land registry database 242a. A second entry may include land registry data source 242b in association with the identified latency (e.g., 2 ms) of the land registry data source 242b, and so forth. Thus, each respective data source 270 may have a separate entry containing a latency of the respective data source 270, and the lowest latency data sources 270 may be identified from the data structure. As explained in further detail below, the lowest latency data sources 270 may be returned to the data source sequencer 216, which in turn may generate data source sets 260.

The data sources 270 may be maintained by different third-parties and contain data redundancy and dated information. As such, the data source sequencer 216 may identify which ones of the data sources 270 to utilize during authentication based on reliability and availability.

For data availability, one or more of the data sources 270 may have more relevant information for a particular authentication based on product type and region. For example, only one of the land registry databases 242a-242n and crop pattern databases 244a-244n may be used for authentication of a particular product. The land registry information of the land registry databases 242a-242n may be preferred over crop pattern information of the crop pattern databases 244a-244n for the authentication. As such, a lowest latency one of the land registry databases 242a-242n may be identified as being preferred over a lowest latency one of the crop pattern databases 244a-244n. During authentication, if the lowest latency one of the land registry databases 242a-242n is unresponsive, the lowest latency one of the crop pattern databases 244a-244n may be accessed for authentication.

For reliability, the data source sequencer 216 may identify some of the data sources 242a-256n as having unreliable (e.g., old and outdated) information based on associated timestamps indicating timings of updates to data. Unreliable data sources of the data sources 242a-256n may be excluded from further consideration or reserved to be utilized after more reliable ones of the data sources 242a-256n. In one particular example, lowest latency land registry data source 242n may have information that may be used to authenticate user input and/or sensor input. A timestamp of the information of the land registry data source 242n may indicate that the information was updated three years ago. Hence, the data source sequencer 216 may deem the land registry data source 242n as being unreliable. The data source sequencer 216 may then prefer to utilize another database, for example a lowest latency database from crop pattern databases 244a-244n, for authentication rather than a land registry database 242a-244n.

For response times, the data source sequencer 216 may rely on historical data of interactions with the data sources 270. For example, if historically, one of the data sources 270 is consistently missing information and yielding no results during data authentications that were previously executed, the data source sequencer 216 may remove that one of the data sources 270 from future consideration, or reserve that one of the data sources 270 to be utilized for required information only if all other potential data sources 270 lack the required information or are otherwise unresponsive during execution. Thus, even if the one of the data sources 270 was responsive during polling by the data source poller 214, the one of the data sources 270 may be excluded by the data source sequencer 216 based on historical data.

Starting with an initial sequence based on intuitiveness, the data source sequencer 216 may continuously observe the data sources. The latencies of the data sources 270 may be calculated by the data source poller 214. Based on the latencies (the data source sequencer 216 may receive a list of the lowest of the lowest latency data sources 270 from the data source poller 214), reliability, response times and availability, the data source sequencer 216 may determine a sequence of the acceptable data sources of the data sources 270 that may have a minimal total latency based on a crop type and a region.

Thus, the data source sequencer 216 may prioritize the data sources 270, based on (a) Data reliability, (b) Data availability and (c) Response time and generate a sequenced data structure (e.g., array or lookup table) based on the prioritization. Moreover, the data source sequencer 216 may further generate the sequenced data structure based on region and product type. That is, different sequences of data sources 270 may apply to different regions and product types, which the data source sequencer 216 may consider. For example, different crops may need information from different data sources 270. As such, different sequences may be generated.

The sequenced data structure may be stored in the data source sets 260, and include different sequences of the data sources 270, which may be utilized depending on the product type, subtype and geographic region. As noted above, the data source sequencer 216 may identify the data reliability of the data sources 270. A list of the lowest latency databases from the data sources 270 may be provided to the data source sequencer 216. A sequenced data structure stored by the data source sets 260 may be structured as follows:

TABLE I

| Region | Product Type | Product subtype | Sequences (in order) |
| --- | --- | --- | --- |
| R1 | Coffee | Raw | land registry database 242a, crop pattern database 244b, yield database 246n, region specific model 256d |
| R2 | Cashew | Raw | yield database 246b, Certificate database 252k |
| R1 | Coffee | Processed | land registry database 242d, crop pattern database 244e, yield database 246a, region specific model 256d. |
| R2 | Cashew | Processed | yield database 246f, Certificate database 252h |

Therefore, the data source sequencer 216 may identify various sequences (combinations) of the acceptable data sources of the data sources 270 and store those sequences as data source sets 260. Not every database may be accessed during authentication. For example, in the first entry the crop pattern database 244b may only be accessed if the land registry database 242a is unresponsive during authentication. If however, the land registry database 242a is responsive, the process may operate only on information from the land registry database 242a and not access the crop pattern database 244b, yield database 246n, region specific model 256d.

As noted above, the sequences may further be generated based on the crop type and region to access relevant data sources 270 for that particular crop type and region. Each sequence may have a certain time to life beyond which there is shuffling to check for better response times.

In one example, the data source poller 214 may identify that land registry database 242a has a shortest latency from the land registry databases 242a-242n, and crop pattern data base 244a has a lowest latency from the crop pattern databases 244a-244n. The data source sequencer 216 may initially identify that a sequence is therefore to include the land registry database 242a followed by the crop pattern database 244a based on reliability and availability. After a certain amount of iterations, the data source sequencer 216 identifies that the land registry database 242a is unreliable, and therefore the crop pattern database 244a is being accessed during the iterations. The data source sequencer 216 may then shuffle the sequence so that the crop pattern database 244a is first, and the land registry database 242a is second as the land registry database 242a is deemed unreliable. This may result in only one access to the crop pattern database 244a during authentications, thereby enhancing efficiency and time. The data source selector 218 may then refer to the data source sets 260 and identify that databases 244a, 242a may be used to authenticate that particular product in that stated order.

In detail, the data source selector 218 may identify which sequence of data sources 270 to execute based on the sequenced data structure of the data source sets 260. Such a determination may be based on several factors, including a given region, product type and product sub-type, as indicated in Table I above. The data source selector 218 refers to the sequenced data structure stored by the data source sets 260 to decide which data sources 270 to retrieve information from, and in what sequence. The data source selector 218 may identify the region, product and product sub-type based on one or more of the sensor data or the user input, and use this information as a key to identify the appropriate sequence.

The authentication scorer 222 may authenticate the sensor data from the proximate sensors 206, 208 and the user input from the display 204 by identifying contradictions in the user input and the sensor data that may correspond to false data. For example, the authentication scorer 222 may receive a sequence of the data sources 270 from the data source selector 218 to perform the authentication.

In one example, the authentication scorer 222 may identify from the user input, different attributes (e.g., approximate weight, type, amount, certifications) of the product. As noted above, proximate sensor 206 may include an imaging device to capture an image of the product to be authenticated, and the proximate sensor 208 may include a positioning system. Other data may be captured by unillustrated sensors, such as a time that the image was captured by the proximate sensor 206, and/or a weight of the product. The image and position may be received by the authentication scorer 222 and used to authenticate the user input or other sensor data. For example, the position may be used to authenticate the image to ensure that the image is accurate, by verification that the image is of a product that may be grown at a particular location identified by the position. The authentication scorer 222 may assign an authentication score to the user input and sensor based on the following:

1. Whether the user has a farm according to the land registry database 242. If not, the authentication score may be lowered.
2. The authentication scorer 222 may compare a position of the sensor data to the land registry database 242 to identify whether the image was captured at the user's property (e.g. farm) or outside of the user's property. The authentication score may be lowered when the image was not captured at the user's property.
3. Whether the type of the product (identified from user input or an image of the product through deep learning) conforms to the typical crop pattern as indicated by one or more of the crop pattern databases 244, farm specific models 254 and/or region specific models 256 and lower the authentication score if not.
4. Whether the user input matches the image. For example, a type of product in the image may be identified through deep learning techniques. If the type of product in the image (e.g., coconuts) is different from the type of product (e.g., coffee) the user has input, lower the authentication score.
5. Whether the yield of the user's property exceeds normal boundaries, as indicated by yield databases 246. For example, the total yield of the user's land (the total amount from the entire growing season) may be tracked, and if the total yield exceeds a predetermined amount of yield (may be calculated from farmer land area and expected yield values per area of land for a particular crop), lower the authentication score. The total yield may be calculated as a cumulative amount of product submitted by the user during a growing season. Whether the proximate sensors 206, 208 conform to specific standards. For example, the proximate sensors 206, 208 may be compared to the sensor databases 250 to identify the reliability of the proximate sensors 206, 208. If one or more of the proximate sensors 206, 208 is identified as being a type of sensor that is unreliable (e.g., the proximate sensor 206 is of a type that will typically produce low quality images or the proximate sensor 208 can only give GPS coordinates within a 20 mile accuracy), then the authentication score may be lowered. Furthermore, only certain types of authorized sensors may be used to identify different characteristics, and the authentication score should be lowered if an unauthorized sensor is used.

6. Whether certificates provided in the user input match registered certifications as indicated in the certificate databases 252. For example, if the user input indicates that the product is organic, but the certificate databases 252 contain no indication that the farmer is organically certified, then the authentication score may be lowered.
7. Whether the user input and the sensor data corresponds to a farm specific product model contained in farm specific model models 254. For example, typical product characteristics of a farm (type of product, amount of product, time of harvest) may be contained in the farm specific models 254, and compared to the sensor data and the user input. If one or more features of the sensor data or the user input deviate from the farm specific models 254, the authentication score may be lowered.
8. Whether the user input and the sensor data corresponds to a region specific product model contained in region specific models 256. For example, typical product characteristics of a region (type of product, amount of product, time of harvest) may be contained in the region specific models 256, and compared to the sensor data and the user input. If one or more features of the sensor data or the user input deviate from the region specific models 256, the authentication score may be lowered. For example, if the yields from surrounding farms are lower than the average yield, but the user input and/or sensor data indicates a yield that is significantly higher than the average, the authentication score may be lowered.

The authentication scorer 222 may also undertake different authentications depending on the availability of information. For example, suppose the user input and sensor data indicates that a farmer is growing strawberries, and that the land registry database 242 contains no indication of the specific crop grown by the farmer. The crop pattern database 244 however may indicate that most of the region is growing coffee. Thus, there exists a discrepancy that may need further authentication. So, the authentication scorer 222 may then receive data relating to the farm specific model 254. If the farm specific model 254 indicates that the farm typically grows strawberries, then the authentication score may be high. If data is unavailable from the farm specific model 254, the region specific model 256 may be accessed to identify whether strawberries are grown in the region, and particularly whether the farmer's neighbors grow strawberries. If so, the authentication score may be high.

If the farm specific model 254 does not exist, the farm specific model 254 may be initiated and trained by the authentication device 202 during the authentication of the product. In some embodiments, the farm specific model 254 is trained during the authentication of the product. For example, a cumulative record of historical data related to a particular farm may be maintained. For example, crop yields, crop types, harvesting times, weather patterns from the current and prior growing seasons of the particular region may be maintained in the farm specific model 254 among any other type of available information. Therefore, the farm specific model 254 may be a historical model of a particular farm.

The region specific model 256 may be a historical model of a particular region. For example, crop yields, crop types, harvesting times, weather patterns from the current and prior growing seasons of the particular region may be maintained in the region specific model 256 among any other type of available information.

In some embodiments, the authentication device 202 may automatically obtain data from the data sources 270, and attach such information to the authentication process by linking the obtained data to the authentication scores. For example, in some embodiments the position may be automatically obtained from the proximate sensor 208. The position may be referenced against the land registry databases 242a-242n to identify an owner of the land that the position is within, and automatically link that owner to the authentication process. In some embodiments, other types of data (e.g., certificates) may be obtained based on the sensor data (e.g., position and identified product from an image) and linked to the authentication process. The obtained data may be provided to a blockchain or digital identifier associated with the authentication process.

The authentication scorer 222 may also use data retrieved from remote sensors 230-240. The remote sensors 230-240 may not be part of the authentication device 202, and may be separate from the authentication device 202. The external sensors 230-240 may include various environmental sensors, such as air temperature, substrate temperature (root zone temperature), plant temperature of the product, humidity, average sunlight, wind speed and direction sensors, precipitation sensors, carbon dioxide sensors for greenhouses, and/or irrigation sensors. The external sensors 230-240 may measure environmental factors associated with the growth or production of the product, and/or characteristics of the product (e.g., weight, moisture percentage, etc.).

Thus, if the remote sensors 230-240 contradict the user data and/or the sensor data, the authentication score may be lowered. For example, if the remote sensors 230-240 indicate that the region is experiencing a drought and that the farmer has not irrigated his fields, it may be logically inferred that the yields would be lower. If however the user input and/or sensor data indicates an unusually high yield, the remote sensor data contradicts the user data and/or input such that the authentication score is lowered by the authentication scorer 222.

Therefore, the authentication score may be an indicator that the user input and/or the sensor data is indeed truthful by verification against different data sources 270, and environmental factors measured by the remote sensors 230-240 to detect contradictions. By verifying a user's claims as indicated above, a more accurate indicator of the product's value is provided.

The external sensor interface 228 may identify and interact with the remote sensors 230-240. In some embodiments, the external sensor interface 228 may further be configured to receive data from the proximate sensors 206, 208. The external sensor interface 228 may identify a measurement of a communication strength between the authentication device 202 and each respective remote sensor 230-240. In some embodiments, the communication strength may be identified through an identification of a distance between the authentication device 202 and the remote sensors 230-240. For example, the remote sensor 230 may be closer to the authentication device 202, and therefore have better communication strength than remote sensor 240 that is distal from the authentication device 202. As such, the strength of communication (e.g., signal strength) will degrade as the remote sensors 230-240 are placed farther from the authentication device 202.

Therefore, the external sensor interface 228 may choose to interact with one of the sensors having the higher communication strength, to receive remote sensor data from the one of the sensors. Therefore, with the external sensor interface 228, the authentication device 202 may seamlessly connect to one or more of the remote sensors 230-240 that is nearby, without the interference of one or more of the remote sensors 230-240 that are distant.

In some embodiments, the user may be prompted via the display 204 to take the authentication device 202 near one of the remote sensors 230-240, when the external sensor interface 228 detects that the strength of communication between one of the remote sensors 230-240 and authentication device 202 is unacceptable for communication. It may be necessary to retrieve data from one of the remote sensors 230-240, and so the authentication scorer 222 may wait to provide a final authentication score until the data is retrieved. The user may only be prompted to travel to a particular area or location, without an indication of which of the remote sensors 230-240 are located in that particular area or location. That is, the user may not be aware of which remote sensor 230-240 has been selected to obtain a reading. Doing so may provide a more anonymous process by avoiding disclosure of details to the user. This may prevent or reduce manipulation of the authentication score on the end of the user.

In some embodiments, it may become difficult to verify the sensor data and the user input. Therefore, the disambiguation requester 226 may enact a graceful degradation process to request more information from the user and with reference to rules 224. For example, if the user input and/or sensor data lacks any indication of the type of product, the disambiguation requester 226 may prompt the user via the display 204 to provide the type of product through another user input and/or the proximate sensors 206, 208 (e.g., enter more information through GPS or camera). In some embodiments, the graceful degradation may be caused by lack of data from data sources 270.

The data adaptor 220 may handle input/output transformations to communicate with the various data sources 270. This allows for the data sources 270 with different interfaces to be interchangeably connected seamlessly to the authentication device 202.

The authentication device 202 may be communicatively coupled to a synchronization cloud 258. The synchronization cloud 258 may contain a predetermined number of the last transactions or authentications executed by various authentication devices 202 from various regions. Therefore, authentication scores from various authentication devices 202 are stored in the synchronization cloud 258 in association with the underlying sensor data and user inputs used to generate the authentication scores. Thus, the synchronization cloud 258 may store authentication data, wherein the authentication data is determined by previous authentications of a plurality of products.

The synchronization cloud 258 may be considered a "cache" for authentication scores associated with user inputs and sensor data. The local shared storage device 212 may synchronize with the synchronization cloud 258 at predetermined intervals, or may be triggered to synchronize with the synchronization cloud 258 when the synchronization cloud 258 is updated. In the local shared storage device 212, each of the transactions has certain time-to-live, beyond which it will be removed so that latest data can be fetched from data sources 270

The data retriever 210 may identify whether a current authentication is substantially similar to one or more of the previous authentications stored by the local shared storage device 212 based on whether the product, that is currently being authenticated, is substantially similar to one or more of the plurality of products. For specific parameters identified from the user input and/or the sensor data (e.g., given region and crop type), the data retriever 210 may identify whether the local shared storage device 212 contains corresponding data that matches or is identical to the parameters. If not, the authentication scorer 222 may authenticate the user input and the sensor data as described above with respect to the data sources 270.

If so, the data retriever 210 may retrieve the authentication score(s) from the local shared storage device 212 that were previously generated for the parameters, and provide the authentication scores to the authentication scorer 222. The authentication scorer 222 may use the authentication scores to generate an aggregated authentication score of the product.

For example, the user input and/or the sensor data may indicate a given crop type for a particular region. If the given crop type for the particular region has been previously authenticated and was assigned an authentication score, the authentication score may be stored in the local shared storage device 212 and the synchronization cloud 258. Therefore, the data retriever 210 may provide the authentication score from the local storage device 212 to the authentication scorer 222 which may use that authentication score to determine an aggregated authentication score of the product. In some embodiments, the authentication score of the local storage device 212 may relate to only a portion (feature) of the sensor data and the user input, in which case the authentication score may be used by the authentication scorer 222 as a part of an aggregated authentication score generation, and the authentication scorer 222 may access the data sources 270 as described above to generate the remainder of the data needed for the aggregated authentication score. In some embodiments if the user previously authenticated a similar or same product recently, the aggregated authentication score may be retrieved from the local shared storage device 212 and assigned to the current product.

In some embodiments, the local shared storage device 212 may be bypassed or omitted so that the data retriever 210 interacts directly with the synchronization cloud 258, and similarly to as described above with respect to the local storage device 212. Furthermore, in some embodiments the authentication device 202 may be a server connected to a user device containing the display 204, and proximate sensors 206, 208 through the internet for example. Moreover, one or more of the local shared storage device 212 or the synchronization cloud 258 may be referred to as a storage device.

In the above embodiments, since there can be multiple validations that can happen in a very short period of time, the processing at the authentication device may be efficient, fast and lightweight, so that local processing is minimal and unobtrusive. The authentication device 202 may receive data through the display 204 and proximate sensors 206, 208 for validation, and select sensors from sensors 230-240, and data sources from data sources 242-256270 without user intervention. The same authentication device 202 may be used for multiple product type validations. For example, while agricultural products are described above, the system 200 may be modified to authenticate data related to animal products. Furthermore, the authentication score generated by the authentication scorer 222 may be stored on a blockchain or remote server.

The above described features may be implemented in a computing device, for example as a processor, computer readable storage medium, logic (configurable and hardware) and so forth. Each of the components described herein may be implemented in hardware, in software, or in some combination thereof. For example, each component of the authentication device 202 described above, including the data retriever 210, local shared storage device 212, data source sets 260, data source selector 218, data source poller 214, data source sequencer 216, data adaptor 220, authentication scorer 222, rules 224, disambiguation requester 226, and external sensor interface 228, as well as the data sources 270, synchronization cloud 258 and other components described herein may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, C++ or the like and conventional procedural programming languages, such as the "C" programming language or similar programming languages.

Figure 3:
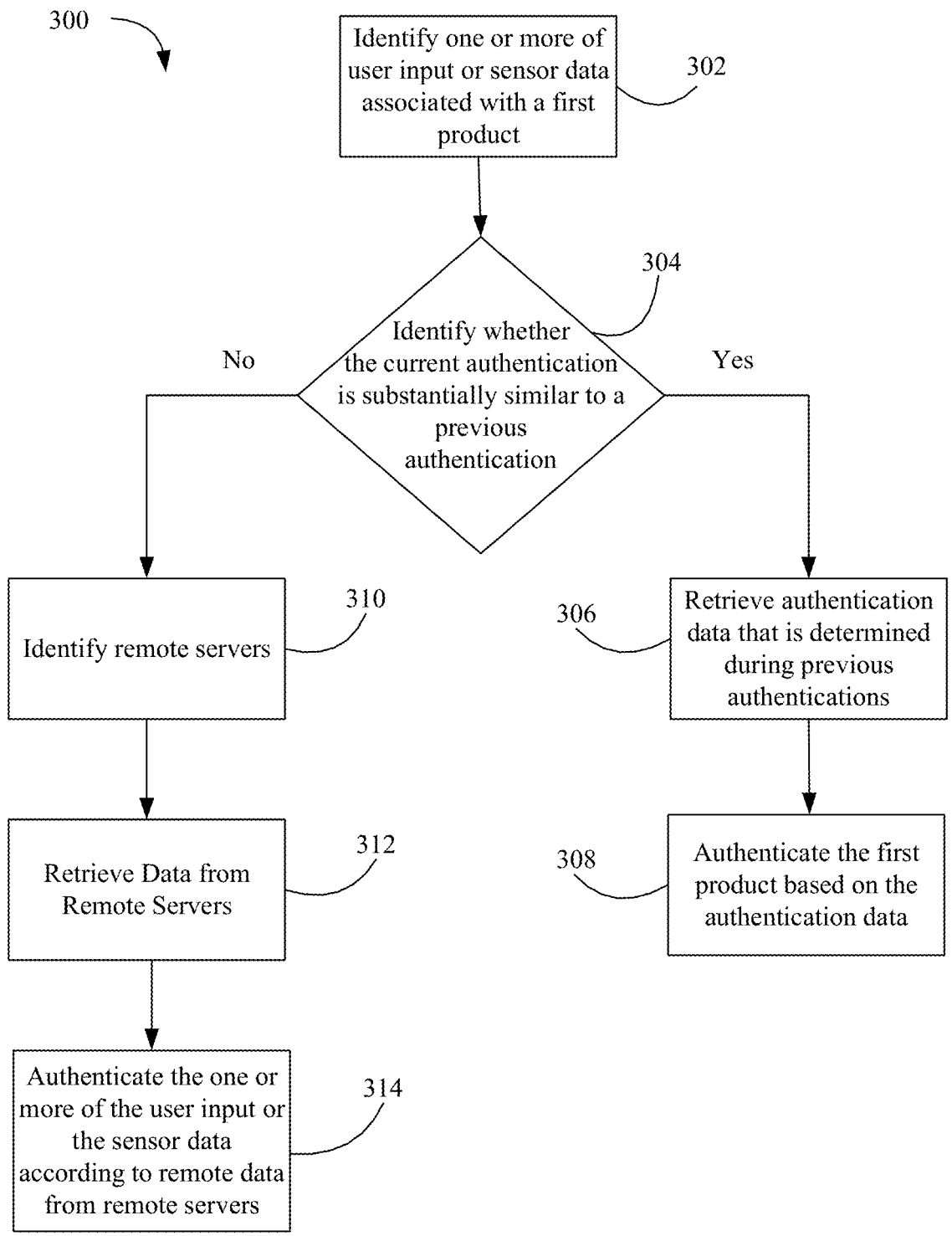
FIG. 3 illustrates a method to authenticate a product according to an exemplary embodiment.

Referring to FIG. 3, a method 300 for calculating an authentication score, according to an exemplary embodiment, is shown. Block 302 may identify one or more of user input or sensor data associated with a first product. The user input may be provided via a graphical user interface, and the sensor data may be received from one or more sensors. Block 304 may identify whether the current authentication is substantially similar to a previous authentication, based on whether the first product is substantially similar to a product authenticated in the previous authentication. If so, authentication data (e.g., an authentication score) that was determined during the previous authentication is retrieved from a local memory or a cloud at block 306. Block 308 may authenticate the first product based on the authentication data, for example by assigning the same authentication score to the first product.

If block 304 determines that the first product has not been previously authenticated, block 310 may identify remote servers that contain data to facilitate authentication. Block 312 may retrieve remote data from the remote servers that contain data to facilitate the authentication. Block 314 may authenticate the one or more of the user input or the sensor data according to the remote data from the remote servers to generate a new authentication score.

Each of the methods described herein may be implemented in hardware, in software, or in some combination thereof. For example, each of the method blocks, such as blocks 302-314, described herein may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, C++ or the like and conventional procedural programming languages, such as the "C" programming language or similar programming languages.

Figure 4:
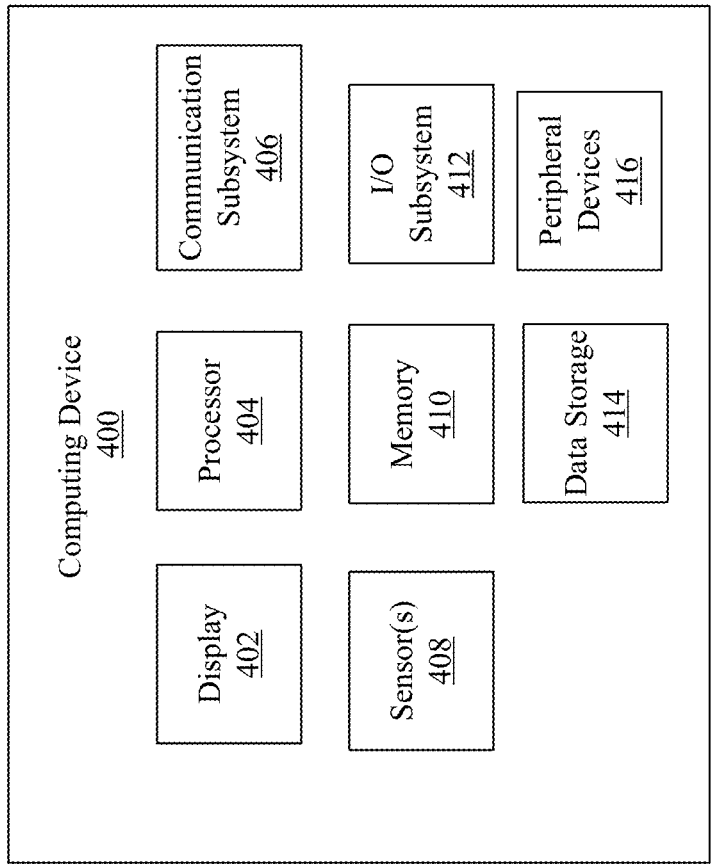
FIG. 4 illustrates a block diagram of a computing platform according to an exemplary embodiment.

Referring now to FIG. 4, an exemplary computing device 400 for performing the method 300 of FIG. 3 and/or implementing at least the authentication device 202 of FIG. 2. The computing device 400 may include a display 402, processor 404, a memory 410, a data storage 414, a communication subsystem 406 (e.g., transmitter, receiver, transceiver, etc.), an I/O subsystem 412, sensor(s) 408 and peripheral devices 416. Additionally, in some embodiments, one or more of the illustrative components may be incorporated in, or otherwise form a portion of, another component. For example, the memory 410 and data storage 414, or portions thereof, may be incorporated in the processor 404 in some embodiments. The computing device 400 may be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device.

The processor 404 may be embodied as any type of processor capable of performing the functions described herein. For example, the processor 404 may be embodied as a single or multi-core processor(s), digital signal processor, microcontroller, or other processor or processing/controlling circuit.

The memory 410 may be embodied as any type of volatile or non-volatile memory or data storage capable of performing the functions described herein. The memory 410 may operate as a cache. In operation, the data storage 414 may be any non-volatile storage architecture to store various data and software used during operation of the computing device 400 such as operating systems, applications, programs, libraries, and drivers. The memory 410 and data storage 414 are communicatively coupled to the processor 404 via the I/O subsystem 412, which may be embodied as circuitry and/or components to facilitate input/output operations with the processor 404, the memory 410, the data storage 414 and other components of the computing device 400.

The data storage 414 may be embodied as any type of device or devices configured for short-term or long-term storage of data such as, for example, memory devices and circuits, memory cards, hard disk drives, solid-state drives, non-volatile flash memory, or other data storage devices. With respect to calculating and determining an authentication score, the data storage 414 may store the above-discussed authentication scores and the underlying components used to determine the authentication scores.

The computing device 400 may also include a communications subsystem 406, which may be embodied as any communication circuit, device, or collection thereof, capable of enabling communications between the computing device 400 and other remote devices over a computer network (not shown). The communications subsystem 406 may be configured to use any one or more communication technology (e.g., wired or wireless communications) and associated protocols (e.g., Ethernet, Bluetooth®, Wi-Fi®, WiMAX, LTE, etc.) to affect such communication.

As shown, the computing device 400 may further include one or more peripheral devices 416. The peripheral devices 416 may include any number of additional input/output devices, interface devices, and/or other peripheral devices. For example, in some embodiments, the peripheral devices 416 may include a display, touch screen, graphics circuitry, keyboard, mouse, speaker system, microphone, network interface, and/or other input/output devices, interface devices, and/or peripheral devices. The computing device 400 may also perform one or more of the functions described in detail below and/or may store any of the components referred to herein.

The computing device 400 may include a display 402 for the user to provide a user input. The display 402 may present a graphical user interface to interact with the user, and may be touchscreen. At least one sensor 408 may be provided as well. The at least one sensor 408 may capture sensor data related to a product, such as weight, an image, timing of production completion, and GPS coordinates.

Figure 5:
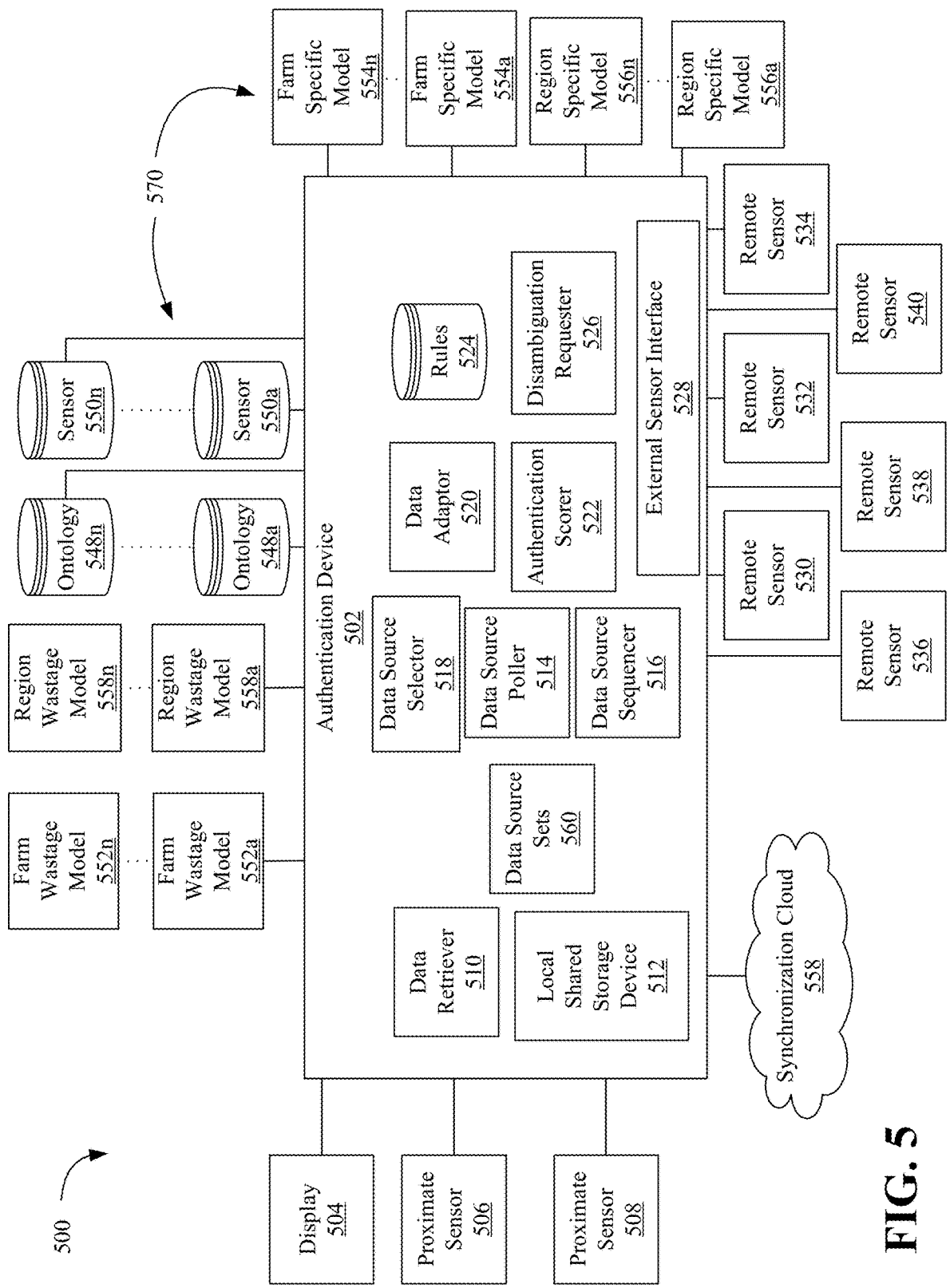
FIG. 5 illustrates a schematic diagram of an overall system architecture according to an exemplary embodiment at a transformation level of a product.

Referring to FIG. 5, a system 500 to authenticate data is provided. The system 500 may be utilized during a state change of a product, for example the transformation 106 of FIG. 1, and after the product has already been produced and entered by system 200. Similar components and features as to those described with respect to FIG. 2 will be omitted herein for brevity. As illustrated, the authentication device may be connected to data sources 570 that includes databases 548, 550 and models 552-558.

The farm specific wastage model 552 may indicate the amount of wastage that may typically occur with products from a particular farm. For example, after a product is first produced and authenticated by the system 200, the product may be shipped to a transformation facility. In the case of coffee, the transformation facility may be responsible for one or more of drying, milling, roasting or grinding the coffee. A certain percentage of the product may become unusable during the transformation. The farm wastage model 552 may model the typical amount of wastage for a particular farm and product, while the region wastage model 558 may model the typical amount of wastage for a particular region and product. The authentication device 502 may receive wastage estimation from one or more of a user input received via the display 504 or sensor data received via proximate sensors 506, 508. If the wastage estimation deviates substantially from one or more of the farm wastage model 552 or the region wastage model 558, the authentication scorer 522 may degrade the authentication score.

As illustrated, there is also a farm specific model 554 and a region specific model 556 that may be used to verify authenticity. The product type and region may be identified from the user input, the sensor data, a blockchain or digital identifier associated with the product, and may be compared to the farm specific model 554 and region specific model 556. The authentication scorer 522 may determine from the comparison, whether the type of product typically originates from the region and farm, and if not may lower the authentication score.

While the system 500 is described with respect to a transformation, the system 500 may also be applied to a custody change (e.g., transportation) as well. For example, a wastage during transport may be identified (amount of product that is unusable after transportation) by the user input and sensor data, and compared to typical amounts of wastage via one or more of the farm wastage model 552 or the region wastage model 558 to identify an authentication score.

Figure 6:
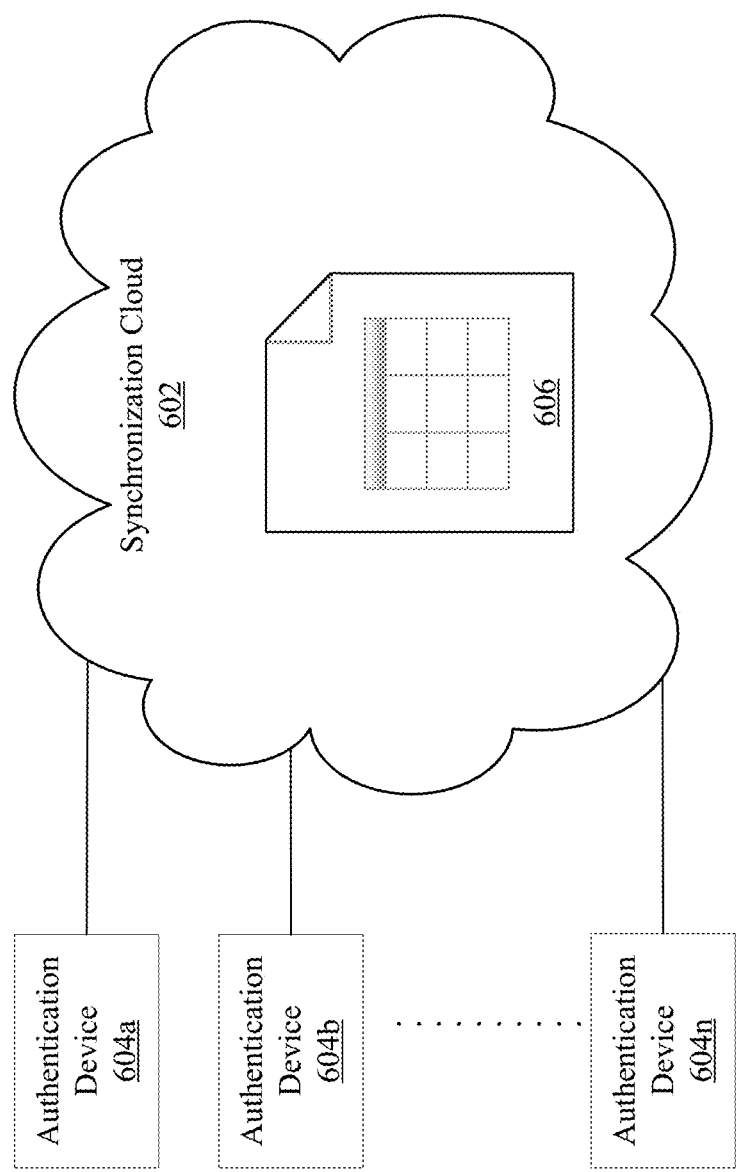
FIG. 6 illustrates a synchronization cloud according to an exemplary embodiment.

FIG. 6 illustrates a synchronization cloud 602 that may be used with any of the embodiments described herein. The synchronization cloud 602 is communicatively coupled to authentication devices 604a-604n. The synchronization cloud 602 may include a synchronization database 606 that contains a last number of authentication transactions executed by the authentication devices 604a-604b from various regions. Each of the authentication transactions may include identified characteristics, such as region, type and so forth, of a product and an authentication score of the product. Each of the authentication devices 604a-604n may provide new authentication transactions to the synchronization cloud 602 for storage in the synchronization database 606.

The authentication devices 604a-604n may receive data by synchronizing with the synchronization cloud 602. The authentication devices 604a-604n may each store a copy of the synchronization database 606. In some embodiments, the authentication devices 604a-604n may not store a copy of the synchronization database 606, but rather may interrogate the synchronization cloud 602 for relevant data related to authentication of a product.

Figure 7:
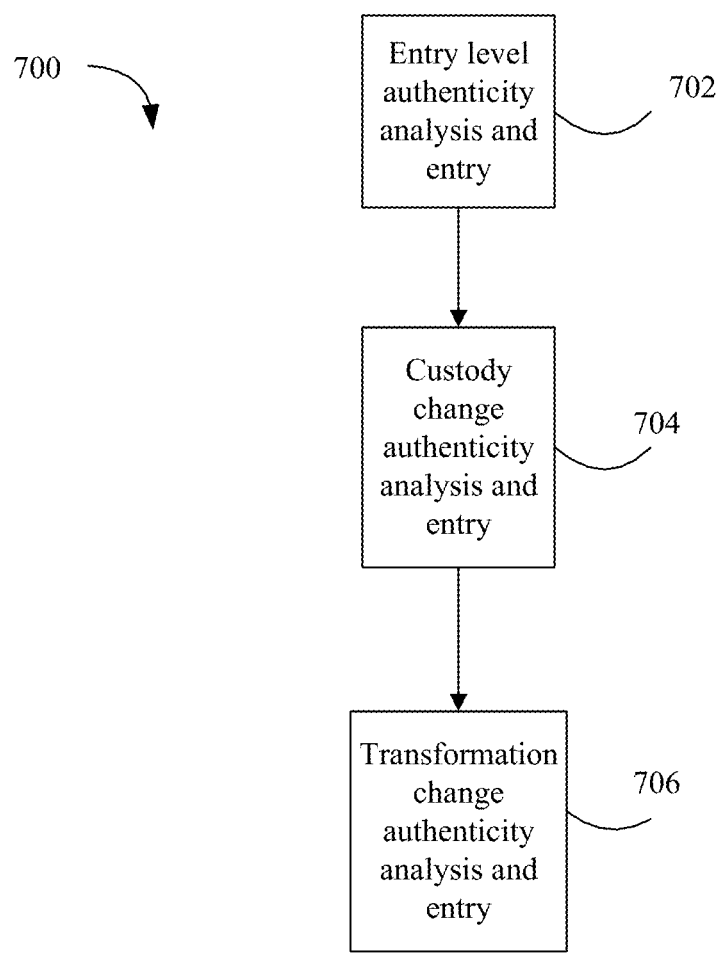
FIG. 7 illustrates a method of authentication scoring according to an exemplary embodiment.

FIG. 7 illustrates a method 700 of authentication scoring. Block 702 may conduct an entry level authenticity analysis and entry. A first authentication score may be entered into a blockchain in association with the entry level. Block 704 may conduct a custody change (e.g., transportation from a producer to a processing plant) level authenticity analysis and entry. A second authentication score may further be entered into the blockchain in association with the custody change. Block 706 may conduct a transformation change (e.g., processing at a processing plant) level authenticity analysis and entry. A third authentication score may further be entered into the blockchain in association with the transformation.

Figure 8:
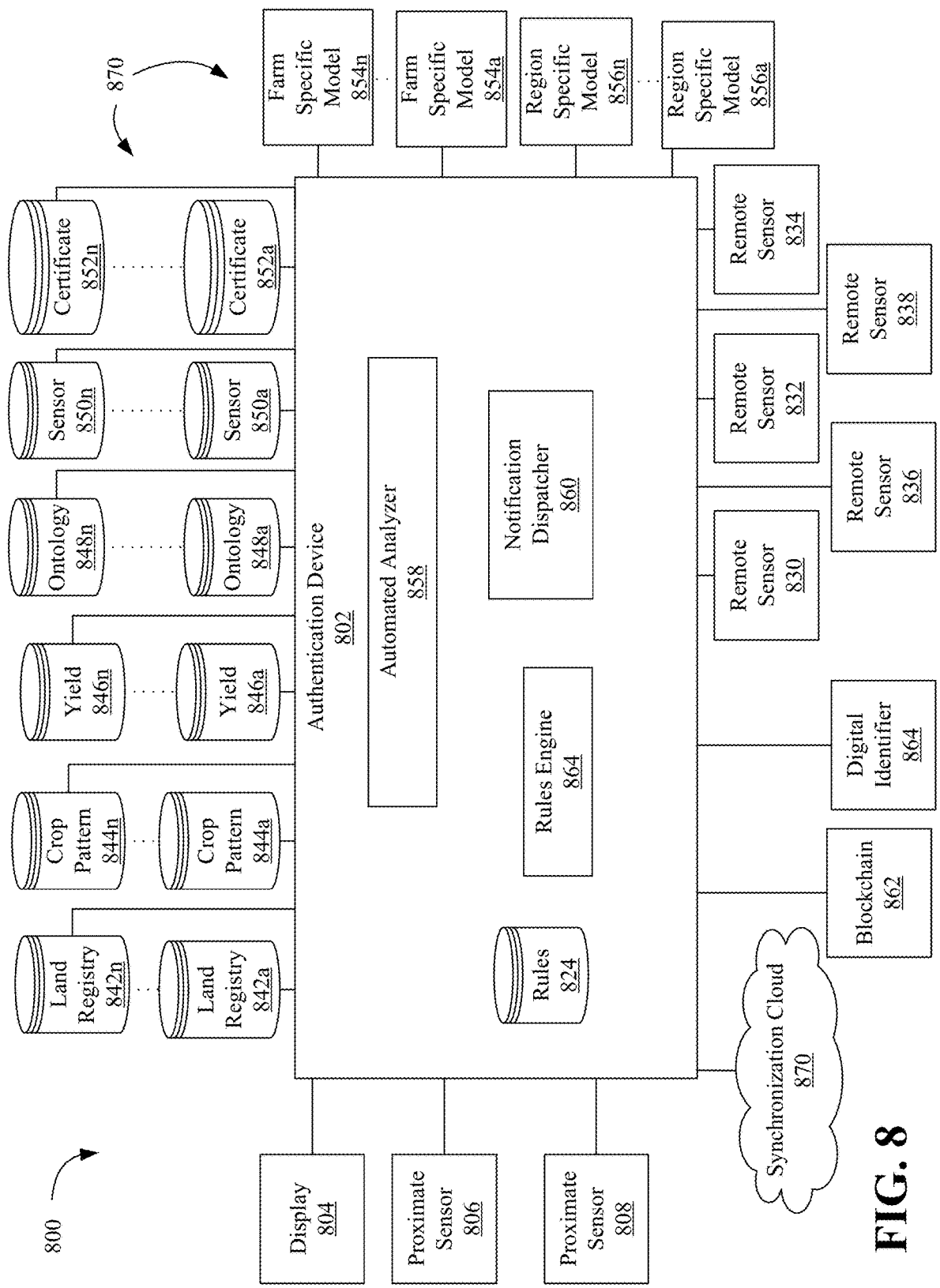
FIGS. 8-10 illustrate schematic diagrams of an overall system architecture according to exemplary embodiments.

FIG. 8 illustrates a system 800 for authenticating user input and sensor data. Similar components and elements as described above will not be described herein for the sake of brevity. The automated analyzer 858 may be readily substituted for the elements described above, for example the data source selectors 218, 518, data source sets 260, 560, data source sequencer 216, 516, data adaptor 220, 520 and/or authentication scorers 222, 522 previously described with respect to FIGS. 2 and 5. In some embodiments, the system 800 may include features from FIGS. 2 and 5 that are not specifically illustrated herein for brevity, such as a data retriever, local shared storage device, data source sets, data source selector, data source poller, data source sequencer, data adaptor, disambiguation requester and external sensor interface.

The system 800 may authenticate data in a similar manner to that described with respect to FIG. 2. The system 800 may be utilized during the production or entry level of a product, for example the production 102 of FIG. 1. The automated analyzer 858 may include several Algorithms to generate one or more of an authentication score, a notification or an alert. As illustrated, the authentication device 802 may be connected to data sources 870 that includes databases 842-852 and models 852-856.

Algorithm 1 may include a calculation of an authentication score for a crop and a region. The crop and region may be identified from one or more of user input or sensor data received via the display 804 and proximate sensors 806, 808. Algorithm 1 may have a following format:

---

Algorithm 1

---

```
Input : Farmer name/ID from the form, farm region from internal DB of registered
farmers and product name from the camera
/* Choose external data source automatically */
/Connect to the Land Registry Data Base 842 & get farm and crop details to
determine authentication score by automated analyzer 858/
if(cropDetails != NULL && cropDetails.name( ) == productName) {
        cropAndRegionAuthenticityScore = HIGH
}
else{
        Connect to the Crop Pattern Data Base 844 and get crop patterns
        if (cPatterns.contains(productName) && productName ==
            (cPatterns.MAJOR || cPatterns.MEDIUM)) {
                cropAndRegionMatchAuthenticityScore = HIGH
        }
        else{
            Get all surrounding farms
            For each surrounding farm
                Find the crop details from Land registry Data Base 842
                if (productType == crop.name( )) { matches[i] = TRUE }
            Done
            if (surroundingCropsMatch(productName, matches) > 50%){
                cropAndRegionMatchAuthenticityScore = HIGH
            }
            else { cropAndRegionMatchAuthenticityScore = LOW }
        }
}
/* Graceful degradation by Rules Engine 864 as earlier data bases failed to
produce a good authenticity score*/
If (cropAndRegionMatchAuthenticityScore = LOW) {
    Send an alert to farmer asking him take the photo of his farm
    /* Ask for more data - triggered due to context */
    Automatically switch on the GPS
    Using the geo-fencing automatically switch on the camera upon
        reaching his farm
    Using the Deep Uearning APIs identify the crop from the photo
    Using reverse geo-coding identify the region
            if(crop.name( ) == productName && region.name( ) == regionName) {
                cropAndRegionMatchAuthentictyScore = MEDIUM
            }
            else {
                cropAndRegionMatchAuthentictyScore = LOW
            }
}
If(farm != NULL && farm.ownerName( ) == farmerName){
    farmerMatchAuthentictyScore = HIGH
}
else {
    farmerMatchAuthentictyScore = LOW
}
Output: cropAndRegionMatchAuthenticityScore & farmerMatchAuthenticityScore
```

As noted above, the automated analyzer 858 may determine an authentication score. The rules engine 864, in conjunction with the rules storage 824, may determine whether a graceful degradation should occur if an authentication score is too low to merit consideration. In such a case the farmer may be prompted to take an action, such as capture and provide a picture of the farm in question, or automatically switch on the proximate sensor 808 to obtain a GPS value.

Algorithm 2 may be used for calculation of authentication scores for validity and fitness of proximate sensors 806, 808 and/or remote sensors 830-838. The Algorithm 2 is presented below:

---
Algorithm 2
---

Input : Product name from the camera
Connect to the ontology database 848 & get the product attribute list for the specified product
For each product attribute
Do
    /* Choose external and proximate sensors set based on the context and product type so that the automated analyzer 858 may determine an authentication score*/
    Get valid sensor types from Sensor Type database 850 for the given product
    Scan proximate and external sensors of matching sensor type for the given product attribute
    /* Check for the sensor's validity and fitness */
    Get the hash of the sensor's embedded firmware
    Get the recommended firmware version from blockchain lookup
    if (actual firmware hash == recommended value) { isSensorValid = TRUE }
    Check if sensor is due for re-calibration fitness from blockchain lookup
    if (sensor.dueForCalibration( ) == FALSE) { isSensorFit = TRUE }
    if(isSensorValid && isSensorFit) {
        sensorValidAndFitAuthentictyScore_SET[i] = HIGH (10)
    }
    else if (isSensorValid || isSensorFit) {
        sensorValidAndFitAuthentictyScore_SET[i] = MEDIUM (5)
    }
    else{
        sensorValidAndFitAuthentictyScore_SET[i] = LOW (0)
    }
    product AttributeNameValuePair_SET[i] = nameValuePair(attributeName, attributeValue)
Done
Output: sensorValidAndFitAuthentictyScore_SET & productAttributeNameValuePair_SET

---

As described by Algorithm 2, the fitness and validity of proximate sensors 806, 808 and/or remote sensors 830-838 may be authenticated to determine the authentication score of the proximate sensors 806, 808 and/or remote sensors 830-838.

Algorithm 3 may generate a calculation of authentication scores for the product attributes. Algorithm 3 is provided below:

---
Algorithm 3
---

Input : productAttributeNameValuePair_SET from Algorithm2
For each productAttributeNameValuePair
Do
    /* Authentication score corresponding to Σ (weight) vs. yield */
    if(productAttributeNameValuePair.getName( ) == "Weight" ) {
        Connect to yielddata base 846 and get the yield of that region
        Get the cumulative weight delivered from that farm during that crop season
    if ( (cumulative weight– yield) < 0) {
        productAttributeRangeAuthenticityScore_SET[i] = HIGH (10)
    }
    else if ((cumulative weight– yield)< MAX_ THRESHOLD) {
        productAttributeRangeAuthenticityScore_SET[i] =MEDIUM (5)
    }
    else {
        productAttributeRangeAuthenticityScore SET[i] = LOW 0)
    }
}

Algorithm 3

```
/* For product attributes other than weight */
    else {
        /* Load 'product-attribute-range' model for the given product*/
        Check for the availability of farm-specific 'product-attribute-range'
        for the given product from farm specific models 854
        if (available) {
            Load the farm-specific classification model of that product
        }
        else {
            Load the region-specific classification model of that product
from the region specific model 856
            Start training the farmer-specific model
        }
        if( productAttributeValue[i] is within range specified by model) {
            productAttributeRangeAuthenticityScore_SET[i] = HIGH (10)
        }
        else{
            productAttributeRangeAuthenticityScore_SET[i] = LOW (0)
        }
    }
Done
Output: productAttributeRangeAuthenticityScore_SET
```

Therefore, Algorithm 3 may compare the cumulative weight of crops delivered from a farm, and compare this to the yield of the region to determine an authentication score. In some embodiments, a typical or average yield of a farm, having a same size as the farm in question, is compared to the cumulative weight, and correspondingly an authentication score is assigned to the weight. As noted, other attributes may also be assigned authentication scores either from the farm specific model or the region specific model.

Algorithm 4 may identify authentication scores for differentiated metadata. Algorithm 4 is presented below:

Algorithm 4

```
Input : Product name from the camera, region, altitude and certificates
Connect to the ontology database 848
Get the product differentiation metadata list for the specified product
For each metadata
Do
    /* Authentication score For Region */
    if(metadata.getName( ) == "Region") {
        Automatically switch on the GPS
        regionFromGPS = reverseGeoCode(gpsLocation.getLatitude( ),
                            gpsLocation.getLongitude( ))
        if(region == regionFromGPS) {
            differentiationMetadataAuthenticityScore_SET[i] = HIGH (10)
        }
        else {
            differentiationMetadataAuthenticityScore_SET[i] = LOW (0)
        }
        Switch off GPS
    }
    /* Authentication score For Altitude */
    else if(metadata.get Name( ) == "Altitude") {
    Automatically switch on the GPS
    altitudeFromGPS = correctAltitude(gpsLocation.getAititude ( ))
    if( altitude== altitudeFromGPS){
            differentiationMetadataAuthenticityScore_SET[i] = HIGH (10)
    }
    else {
            differentiationMetadataAuthenticityScore SET[i] = LOW 0)
    }
    Switch off GPS
    /* Authentication score For Certificates*/
    else if(metadata.getName( ) =="Certificate") {
        Connect to certificate database 852
        certificatesFromDB = certDB.getCertificates(surveyNo, cropType)
        if( certificates ⊆ certificatesFromDB){
                differentiationMetadataAuthenticityScore SET[i ] = HIGH(10)
        }
        else {
                differentiationMetadataAuthenticityScore SET[i] = LOW (0)
        }
    }
Output: differentiationMetadataAuthenticityScore_SET
```

Thus Algorithm 4 may determine authentication scores for differentiation data from GPS coordinates of the farm, altitude of the farm, as well as any publicly available certificates. The Algorithms 1-4 may be executed by the automated analyzer 858 and the rules engine 864.

The rules engine 864 may calculate an aggregate authentication score with reference to rules storage 824 and with a weighting equation. One such example is provided by equation 1 below:

$$\text{Aggregate Authentication score} = (W1*CRVS) + (W2*FVS) + W3*\Sigma_{i=0}^{n}(W_{3i}*SVS_i) + W4*\Sigma_{i=0}^{n}(W_{4i}*PVS_i) + W5*\Sigma_{i=0}^{m}(W_{5i}*DMVS_i)$$

Equation 1

In the equation 1, the following variables are defined:
CRVS=Crop And Region Match Authentication score
FVS=Farmer Match Authentication score
SVS=Sensor Valid and Fitness Authentication score
PVS=Product Attribute Range Authentication score
DMVS=Differentiation Metadata Authentication score
$W_{31}$, $W_{32}$, $W_{33}$, ... $W_{3n}$=Internal weights for SVS
$W_{41}$, $W_{42}$, $W_{43}$, ... $W_{4n}$=Internal weights for PVS
$W_{51}$, $W_{52}$, $W_{53}$, ... $W_{5m}$=Internal weights for DMVS
n=no of product attributes that are read by sensors
m=no. of product differentiation metadata
W1, W2, W3, W4 & W5=Overall Weights Rules storage 824 may include facts that are inputs to the rules engine 864 to determine the aggregate authentication score. The rules storage 824 may include logic and memory. The rule storage 824 may identify which rules need to be run and weights for Equation 1. Different weights may be assigned depending on the product, and whether the product is differentiated. Algorithm 5 for the rules storage 824 is given below:

---
Algorithm 5
---

Facts (are inputs to the rules engine, stored in memory)
(commodity = Coffee)
(type = Robusta)
(evaluation method = differentiated)
/* check which rules need to be run */
Rule set-rule
(commodity coffee)
(evaluation method = differentiated)
Assert (processing = differentiated-coffee)
/* rule to set weights for differentiated coffee of type Robusta */
Rule differentiated-coffee-weightage
(processing differentiated-coffee)
(type = Robusta)
Assert (W1 = 0.1, W2=0.1, W3=0.1, W4=0.1, W5=0.6, //disproportionate weightage to 'differentiation metadata authentication score'
$W_{31}$, $W_{32}$, $W_{33}$, ... $W_{3n}$ = 1/n, //equal weightages internally among various 'sensor authentication scores'
$W_{41}$, $W_{42}$, $W_{43}$, ... $W_{4n}$ = 1/n, //equal weightages internally among various 'Product Attribute authentication scores'
$W_{51}$, $W_{52}$, $W_{53}$, ... $W_{5m}$ = 1/m) //equal weightages internally among various 'differentiation metadata authentication scores'
/* rule to run weights for commodity coffee */
Rule commodity-coffee-weightage
(processing differentiated-coffee)
Assert (W1 = 0.2, W2=0.2, W3=0.2, W4=0.2, W5=0.2, $W_{31}$, $W_{32}$, $W_{33}$, ... $W_{3n}$ = 1/n, $W_{41}$, $W_{42}$, $W_{43}$, ... $W_{4n}$ = 1/n,
$W_{51}$, $W_{52}$, $W_{53}$, ... $W_{5m}$ = 1/m) //equal weightages to all the individual authentication scores

---

If the aggregate authentication score generated by the rules engine 864 is not above a predetermined threshold, no further action is taken (i.e., no digital identifier is created and no blockchain entry). If however the aggregated authentication score is above the predetermined threshold, then a digital identifier 864, which may be a digital twin, may be generated and affixed to the product. The digital identifier 864 may be linked to a blockchain 862. For example, the digital identifier 864 may include a key (private and public keys) to access an entry in the blockchain 862. The digital identifier 864 may also be encoded with the aggregate authentication score, product attribute list identified in Algorithm 2 from the ontology database, as well as any other authentication scores generated by Algorithms 1-4, or any information identified by the system 800. The data stored in the digital identifier 864 may be linked to the producer or farm of the product so it is apparent whether the producer or farm is providing authentic data and products.

The authentication device 802 may store the aggregate authentication score, product attribute list identified in FIG. 2 from the ontology database, as well as any other authentication scores generated by Algorithms 1-4, in the blockchain 862, or any information identified by the system 800. The data stored in the blockchain 862 may be linked to the producer or farm of the product so it is apparent whether the producer or farm is providing authentic data and products. The notification dispatcher 860 may send a notification to the user, via display 804, when the authentication process is complete.

Figure 9:
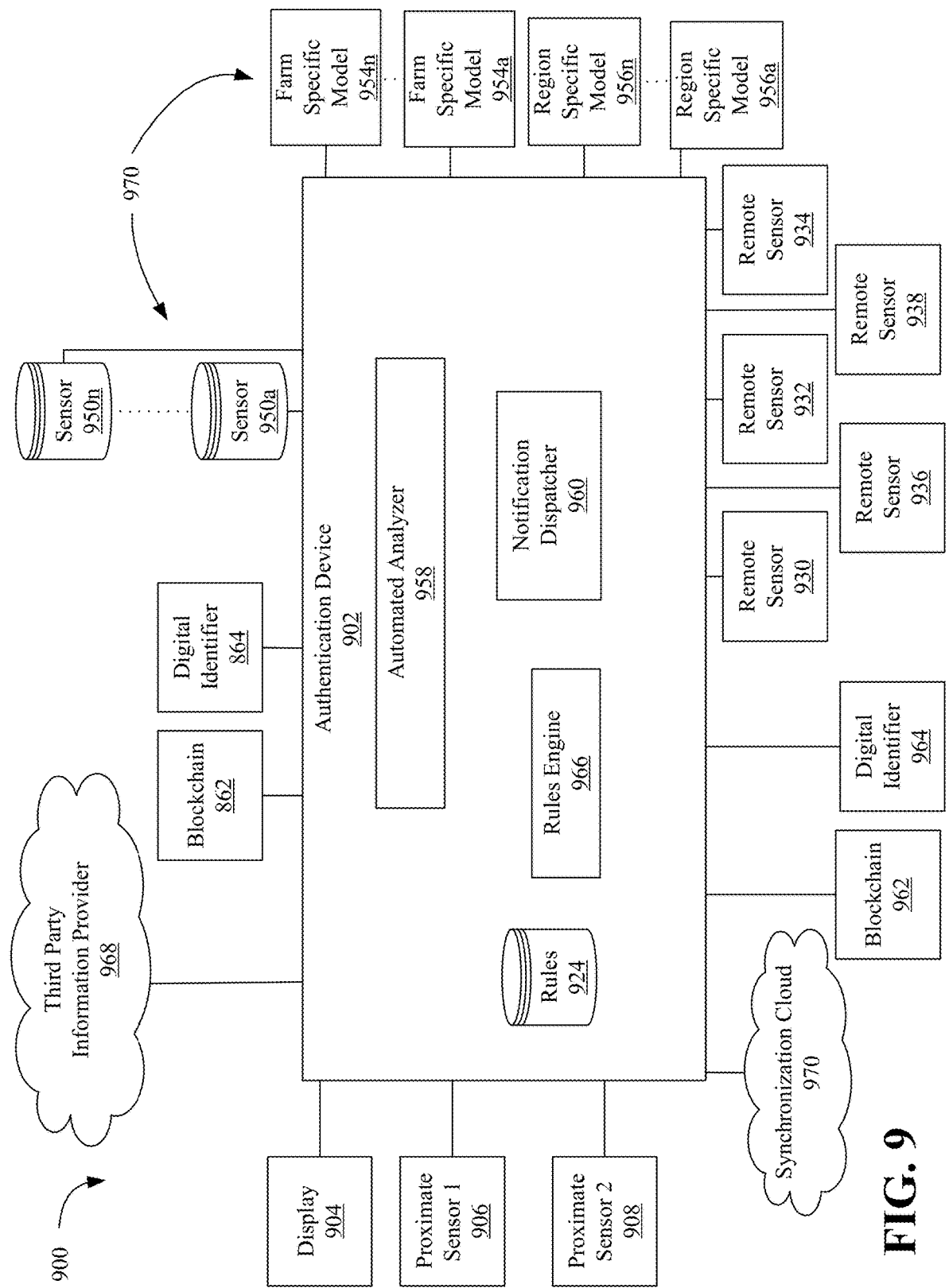

FIG. 9 illustrates a system 900 for authenticating user input and sensor data at a custody change, for example at custody change 104 of FIG. 1. The automated analyzer 958 may generate and provide authentication scores to the rules engine 966. Similar components will not be described for the sake of brevity.

As described, above, system 800 may conduct an authentication process during entry level of the product. System 900 may conduct an authentication process during a custody change (e.g., transportation) of the product. System 900 may authenticate user input and sensor data associated with the product during the custody change. The system 900 may interact with the blockchain 862 and digital identifier 864 established by system 800 in FIG. 8.

As noted, the system 900 may establish authenticity during supply chain transit. Product attributes change naturally over time during transit, so the previous attributes (e.g., color, moisture content, weight) may no longer be useful for comparison. Therefore, automated analyzer 958 may execute Algorithm 2 (described above), but with the attribute list being provided by one or more of the digital identifier 864 or blockchain 862 to validate the proximate sensors 906, 908 and/or remote sensors 930-938, rather than an ontology database. Algorithm 2 may be a calculation of authentication scores for proximate sensors 906, 908 validity and fitness and/or remote sensors 930-938.

Further, to address the above, the automated analyzer 958 may further execute Algorithm 3 (described above) which may be a calculation of authentication scores for the product attributes. Algorithm 3 is modified, for example by not connecting to a yield database, but identifying value(s) from the proximate sensors 906, 908 that relate to the product. The values may be compared against value(s) of the product that are stored in the digital identifier 864 to determine a difference between the values. For example, a weight identified by the proximate sensor 906 may be subtracted from a weight value of the digital identifier 864 to identify a difference in weight values. The difference may checked to determine whether the difference falls within the ranges defined by one or more of the farm specific models 954 or region specific models 956. Authentication scores may be assigned accordingly, so that if the difference is within a certain value, the authentication score is high, but may otherwise be medium or low. Rather than reading values from the digital identifier 864, the blockchain 862 may be accessed to identify the values (e.g., weight).

Additionally, the automated analyzer 958 may execute Algorithm 6 (provided below) to correct the product attribute authentication scores, which are identified by Algorithm 3, by a manual override. Doing so may establish product authenticity during transit and the impact of changes during transit.

For example, the automated analyzer 958 may identify whether an aberrant condition, such as a weather condition (e.g., foggy, humid, rainy), identified from third party information providers 968 may have affected the product attribute authentication scores. For example, generally an agricultural product will lose water weight. Thus, it is usually expected that a harvested agricultural product will not increase in weight.

In some cases however, if the humidity is unusually high or the agricultural products become wet, the weight may actually increase. Verifying the weather conditions may indicate whether an abnormal condition may have occurred. If so, the notification dispatcher 960 may alert the user through the display 904, and inquire whether the user would prefer to manually override the product attribute authentication scores. The user may accept, and override and set the product attribute authentication scores to a higher value.

In order to execute Algorithm 6, the authentication device 902 may connect to the third party information provider 968 to obtain environmental data, such as weather data. The weather data may be an input into the automated analyzer 958. Algorithm 6 is provided below, and may be executed by the automated analyzer 958 and rules engine 966:

---
Algorithm 6

```
Input : productAttributeList from the digital identifier &
        productAttributeRangeAuthenticityScore_SET    from   Algorithm3
executed by automated analyzer 958
        Connect to Third Party Information Providers 968 to obtain weather
        report to obtain the weather data
For each productAttribute from productAttributeList
Do
        if(productAttributeRangeAuthenticityScore_SET[i] == LOW) {
                if(productAttribute.canBeAffectedDueToWeather( ) == TRUE) {
                        if(weather.condition( ) == weather.RAINY || weather.FOGGY) {
                        {
                                /* Manual override with explanation */
                                Alert the user through notification dispatcher 960 if the user
wants to perform manual override
                                Open a dialog box wherein accept to do manual override
with explanation
                                        if (buttonPressed == ACCEPT)
                                        {
                                productAttributeRangeAuthenticityScore_SET[i] = HIGH (10)
                                        }
                        }
                }
        }
}
Done
Output: productAttributeRangeAuthentictyScore_SET
```
---

The rules engine 966 may receive the authentication scores generated by the automated analyzer 958, and generate an aggregated authentication score using a weighted function with the authentication scores as input. The rules engine 966 may execute Algorithm 2 to generate the aggregated authentication score:

$$W_1 * \Sigma_{i=0}^{n}(W_{1i} * SVS_i) + W_2 * \Sigma_{i=0}^{n}(W_{2i} * PVS_i) \qquad \text{Equation 2}$$

In Equation 2, the following variables are defined:
SVS=Sensor Validity and Fitness Authentication score (Algorithm 2)
PVS=Product Attribute Range Authentication score (Algorithm 3)
$W_{11}, W_{12}, W_{13}, \ldots W_{1n}$=Internal weights for SVS
$W_{21}, W_{22}, W_{23}, \ldots W_{2n}$=Internal weights for PVS
n=no of product attributes that are read by sensors
W1 & W2=Overall Weights
The rules database 924 may identify the weights for Equation 2, and provide the weights to rules engine 966.

The authentication device 902 may produce a digital identifier 964 to be affixed to the product, and create a blockchain 962 to contain any data described herein. For example, the authentication device 902 may store any of the authentication scores generated by the authentication device 902 in the digital identifier 964 and the blockchain 962. In some embodiments, the blockchain 962 may be the same as blockchain 862, and the blockchain 862 is updated to include further information by the authentication device 902.

Figure 10:
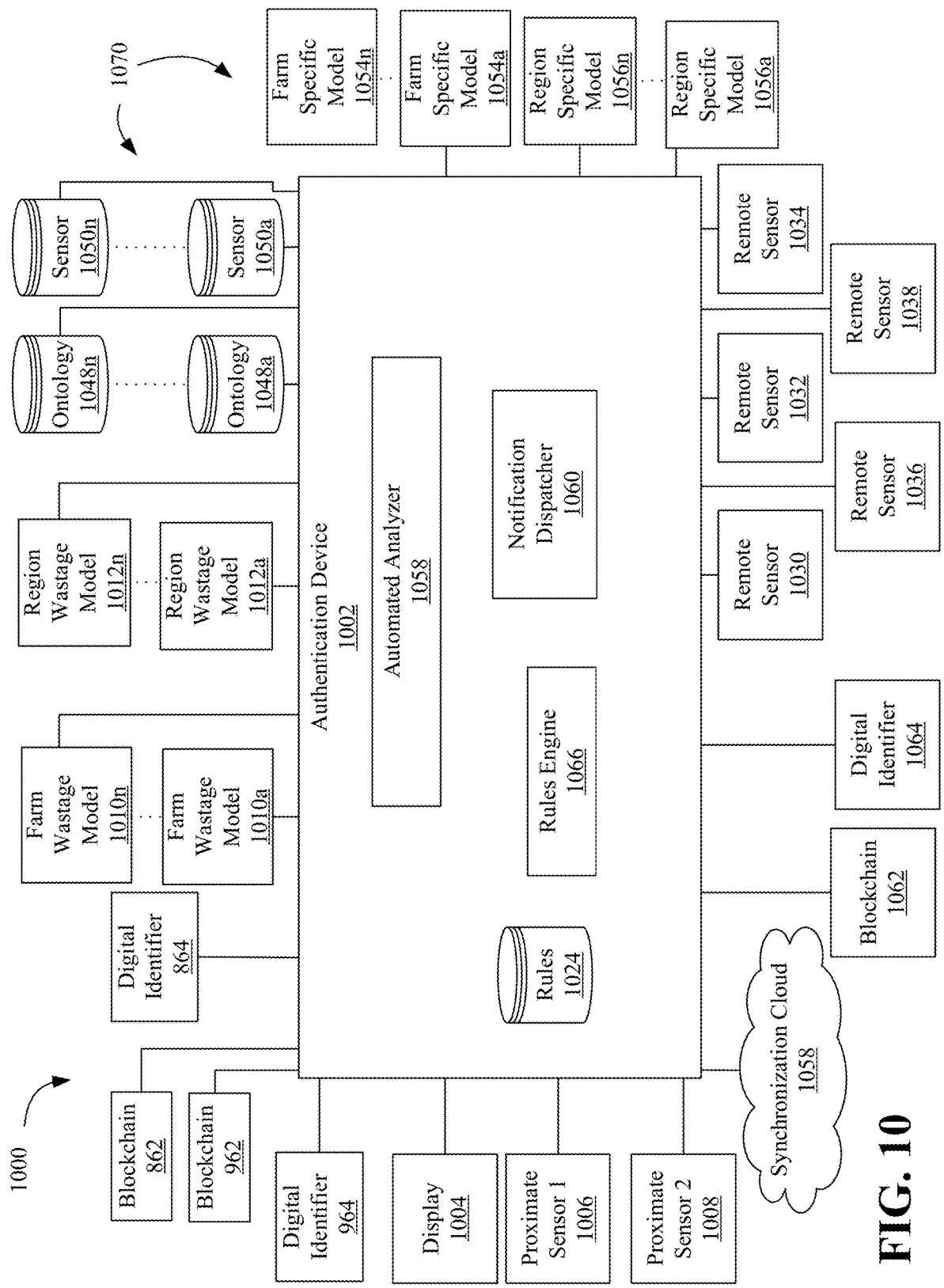

FIG. 10 illustrates a system 1000 for authenticating user input and sensor data at a state transformation. The automated analyzer 1058 may generate and provide authentication scores to the rules engine 1066. Similar components will not be described for the sake of brevity.

The state transformation may include a processing of the product described with respect to FIGS. 8-9. For example, in the example of coffee, the coffee may be grown, harvested and then authenticated by system 800. The coffee may then be transported, and authenticated by system 900. The coffee may then arrive at a roaster and grinder, and may be authenticated by the roaster and grinder with system 1000. The system 1000 may be used to authenticate the output product (processed) during product transformation or transformation 106 of FIG. 1.

ables, including the commodity type, the region where it is grown etc., can have an impact on the wastage weight thereby affecting the output weight. Once the wastage weight is calculated, the wastage weight may be compared to one or more of the farm wastage model 1010 or region wastage model 1012. The farm wastage model 1010 may provide an expected level or range of wastage weight of product produced by the particular farm in question (i.e., the farm that produced the product that has been processed), and may be identified based on the type of product, time of year and so forth. If there is no such farm wastage model available, a region wastage model 1056 may be accessed to identify an expected level or range of wastage weight of product produced by a region of the particular farm in question, and may be identified based on the type of product, time of year and so forth. If the wastage weight conforms to the identified level or range of wastage weight, a higher authentication score is provided, otherwise a low or medium authentication score may be provided.

Algorithm 7 is provided below:

---

Algorithm 7

---

```
Input : inputBagsWeightList – weights of the input bags
        outputBagsWeightList – weights of the output bags after transformation
/* Total input weight */
For each currentInputBagWeight from inputBagsWeightList
{
    totalInputBagsWeight = totalInputBagsWeight + currentInputBagWeight
}
/* Total output weight */
For each currentOutputBagWeight from outputBagsWeightList
{
    totalOutputBagsWeight = totalOutputBagsWeight + currentOutputBagWeight
}
/* Total wastage */
totalWastage = totalInputBagsWeight – totalOutputBagsWeight
/* Load wastage model for the given product*/
Check for the availability of farm-specific wastage classification model 1010 for
the given product
if (available) {
    Load the farm-specific wastage classification model 1010 of that product
}
else {
    Load the region-specific wastage classification model 1010 of that product
    Start training the farmer-specific wastage model
}
if( totalWastage is within range specified by model) {
        massBalanceCheckAuthenticityScore = HIGH (10)
}
else if (totalWastage is out of rage specified by model by a certain THRESHOLD) {
        massBalanceCheckAuthenticityScore = MEDIUM (5)
}
else {
        massBalanceCheckAuthenti city Score = LOW (0)
}
Output: massBalanceCheckAuthenticityScore
```

---

The automated analyzer 1058 may execute Algorithm 2 described above to calculate authentication scores for validity and fitness of sensors 1006, 1008 and/or sensors 1030-1038. The automated analyzer 1058 may execute Algorithm 3 described above to calculate authentication scores for the product attributes.

Additionally, the automated analyzer 1058 may execute Algorithm 7 (below) to calculate an authentication score for the mass balance between total input product and total output processed product. The automated analyzer 1058 may authenticate the product through weight. Several vari- The automated analyzer 1058 may further move differentiation metadata (e.g., certifications etc.) of the product across product transformations automatically. For example, during transformation products with different certifications/no certifications may become mixed. The automated analyzer 1058 may both track the certificates of each product that is mixed together to output a list of total certificates of all of the products, as well as an intersection of the certificates, such as whether each of the products has a same certification. To address this, the automated analyzer 1058 may execute Algorithm 8:

Algorithm 8

```
Input : differentiationMetadataFromInputBags through blockchains one or
more of 862, 962 digital identifiers 864, 964
Connect to the Ontology database 1048
Get the product differentiation metadata list for the specified product
For each metadata
{
    For each inputBag
    {
            currentBagMetadata_SET =
                    inputBag.getDifferentiationMetadata(currentMetadata.getName( ))
            if (currentBag == FirstBag) {
                    UNION_SET = currentBagMetadata_SET
                    INTERSECTION_SET = currentBagMetadata_SET
            }
            else{
                    UNION_SET = (UNION_SET) ∪ (currentBagMetadata_SET)
                    INTERSECTION_SET      =     (INTERSECTION_SET)     ∩
(currentBagMetadataSET)
            }
}
For each outputBag
{
            if(process is Union_Process){
                outputBag.setDifferentiationMetadata(
                    metadata.getName, UNION_SET)
            }
            else {
                outputBag.setDifferentiationMetadata(
                    metadata.getName, INTERSECTION _SET)
            }
    }
}
Output: void
```

The rules engine 1066 may receive the authentication scores from the automated analyzer 1058 and identify an aggregate authentication score. Equation 3 may be used to calculate the aggregate authentication score:

$$W1*\Sigma_{i=0}^{n}(W_{1i}*SVS_i)+W2*\Sigma_{i=0}^{n}(W_{2i}*PVS_i)+W3*MBVS \quad \text{Equation 3}$$

In Equation 3, the following variables are defined:
SVS=Sensor Valid and Fitness Authentication score (Algorithm 2)
PVS=Product Attribute Range Authentication score (Algorithm 3)
MBVS=Mass Balance Authentication score (Algorithm 7)
$W_{11}$, $W_{12}$, $W_{13}$, . . . $W_{1n}$=Internal weights for SVS
$W_{21}$, $W_{22}$, $W_{23}$, . . . $W_{2n}$=Internal weights for PVS
W1, W2 & W3=Overall Weights
n=no of product attributes that are read by sensors
The rules database 1024 may identify the weights for Equation 3, and provide the weights to rules engine 966.

The rules engine 1066 may identify whether the aggregated authentication score is greater than a threshold. If not, the process may finish or request for further information from the user to continue. Furthermore, the rules engine 1066 may consider whether the input product type and the corresponding processed output product grades have a 1:n relationship indicating that of processing is slightly variable. For example, if the input for processing is "Arabica Coffee", then the output grades may only be of particular types (e.g., Plantation PB bold, Plantation AA and Mysore nuggets extra bold). Mapping for 1:n may be utilized for a set of grades only. So, if during processing, a user is trying to label the coffee differently and outside of the "n" choices, then the rules can raise an error and prevent the processing from proceeding/or give a very low veracity score. If not, the process may finish. Otherwise, a digital identifier 1064 may be generated and affixed to the finished product, and a blockchain 1062 may be generated to store any output, such as the authentication scores generated by authentication device 1002, wastage weights and so on. In some embodiments, the digital identifier 1064 may also be encoded with the output. In some embodiments, the blockchain 1062 may be omitted and the blockchain 862 is modified to include the output.

Figure 11:
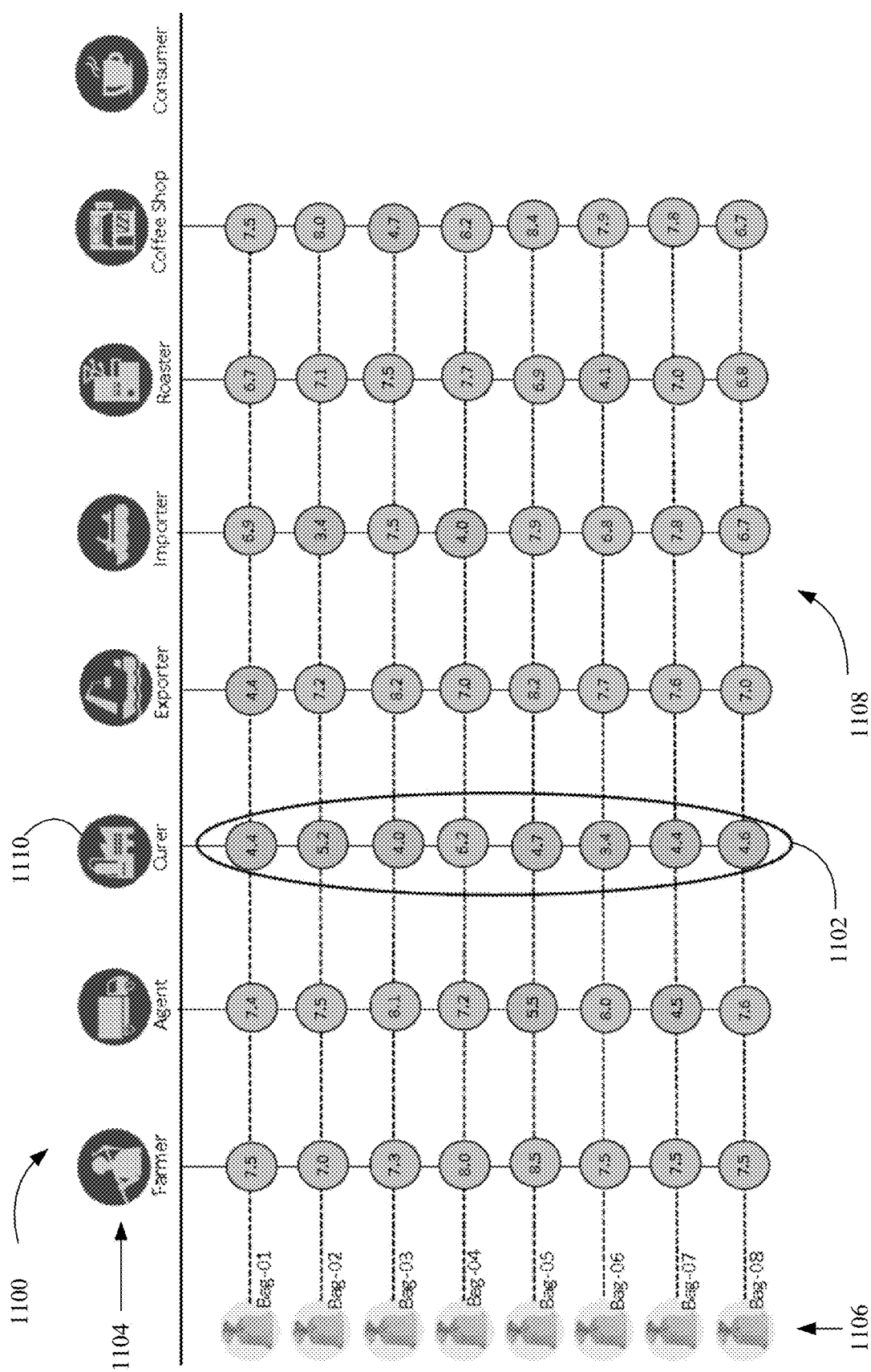
FIG. 11 illustrates a graphical illustration of authentication data according to an exemplary embodiment.

Referring to FIG. 11, a graphical illustration of authentication data 1100 stored on a blockchain is provided. The authentication data 1100 may include a series of actors 1104 who may take control of products 1106 at different points during the production of the products 1106. A series of authentication scores 1108 are provided at the intersection of the actors 1104 and products 1106. The authentication scores 1108 may indicate whether the actors 1106 provided authentic data with respect to the products 1104 that the actors 1106 controlled.

Based on the authentication scores 1108, automatic modifications may occur. For example, as illustrated the curer 1110 consistently has low authentication scores 1102. As such, it is apparent that the curer 1110 is consistently providing low quality data with respect to the products 1106. Thus, future products may be diverted away from the curer 1110 in an automatic fashion. For example, an automatic prompt may be delivered to the farmers indicating that an alternate curer should be utilized. In some embodiments, for example in an automatic shipping scenario, future products may automatically be diverted away from the curer 1110 with no feedback to the farmers. Thus, weaknesses in the supply chain may be identified and the supply chain may be automatically modified to avoid such weaknesses. Further, a consumer may quickly identify whether the product they are about to purchase is genuine.

Figure 12:
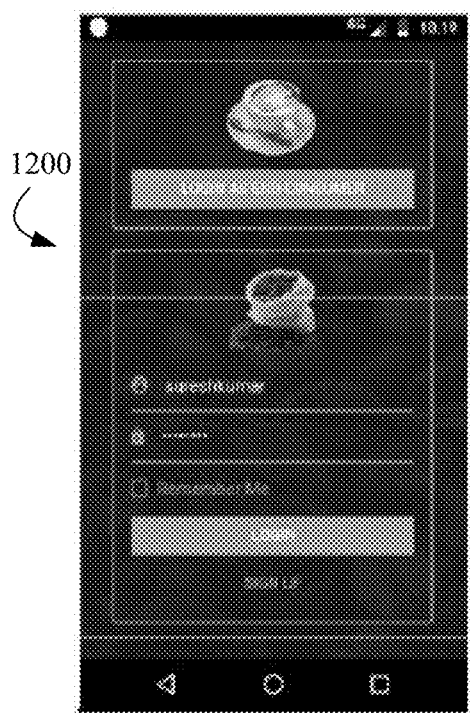
FIGS. 12-16 illustrate graphical user interfaces according to some exemplary embodiments.

FIG. 12 illustrates a graphical user interface 1200 for a user to login according to some embodiments. The graphical user interface 1200 may be implemented by a computing device. Authentication of the user may be required, and different prompts may be provided for an actor in the supply chain, versus an end consumer.

FIG. 13(a) illustrates a graphical user interface 1300 at production (entry level) of a product. The graphical user interface 1300 may be implemented by a computing device. A user may select "tag a bag" as indicated by 1302. After selection of tag a bag 1302, input entry screens 1306, 1308 may be displayed to provide input data for the bag at FIG. 13(b). Several or all fields (e.g., latitude, longitude, elevation, region, moisture, quantity etc.) may be filled out automatically through sensors of the computing device and/or previous historical experience saved by the computing device. As noted above, the input data may be authenticated. Input entry screen 1308 is a continuation of input entry screen 1306. The user may create a digital twin (e.g., QR code that is affixed to the bag) and generate a blockchain containing the input data and authentication scores of the input data.

Figure 13:
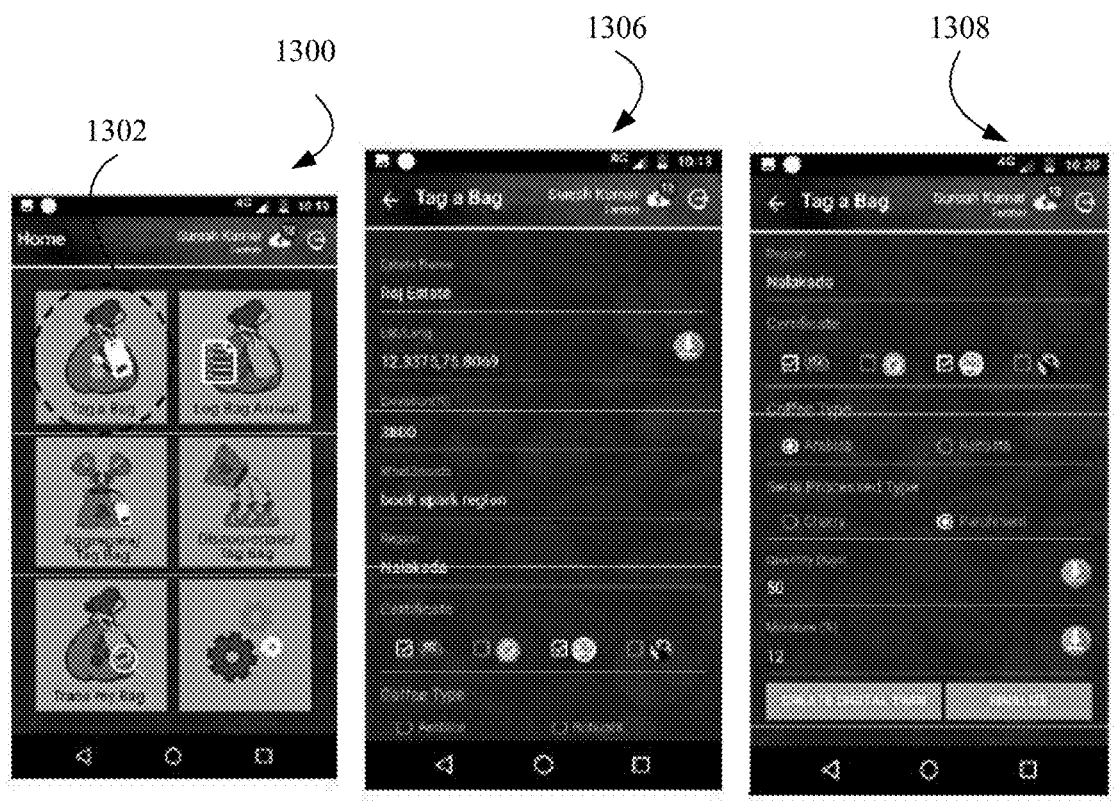

FIG. 14(a) illustrates a graphical user interface 1400 at custody change (transit) of the product described with respect to FIG. 13. The graphical user interface 1400 may be implemented by a computing device. A user may select "log bag arrival" as indicated by 1402. After selection of log bag arrival 1402, input entry screens 1404, 1406 may be displayed as illustrated by FIG. 14(b), to provide input data for the bag. The bag, in particular the digital twin of the bag, may be scanned to prepopulate some data and link input entry screens 1404, 1406 to the blockchain and digital twin. Several or all fields (e.g., latitude, longitude, name etc.) may be filled out automatically through sensors of the computing device and/or previous historical experience saved by the computing device. As noted above, the input data may be authenticated. Further, the input entry screen 1404 may display information obtained from the digital twin and entered at the entry level, such as the type of coffee in the bag and the production origination point. Input entry screen 1406 is a continuation of input entry screen 1404. The user may update the digital twin and update the blockchain to contain the input data and authentication scores of the input data.

Figure 14:
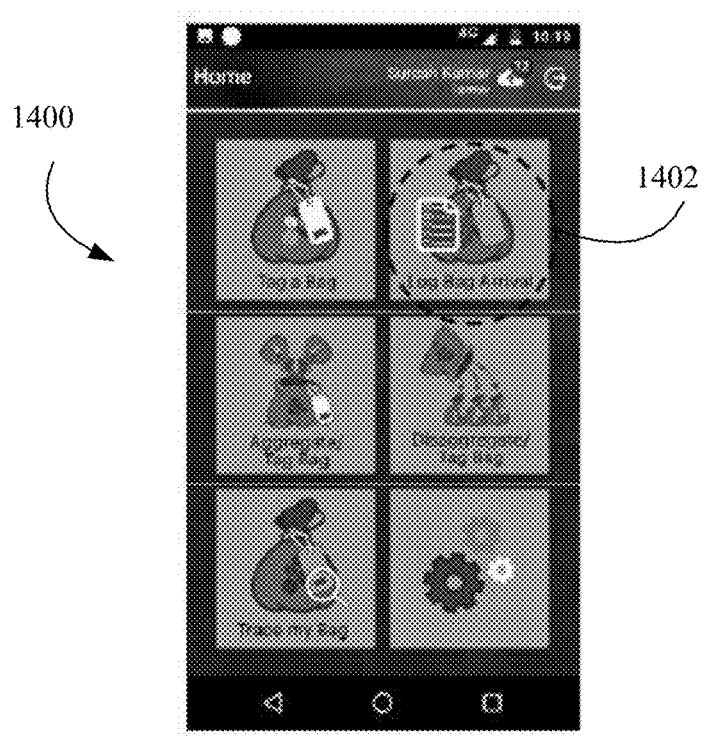
Figure 14:
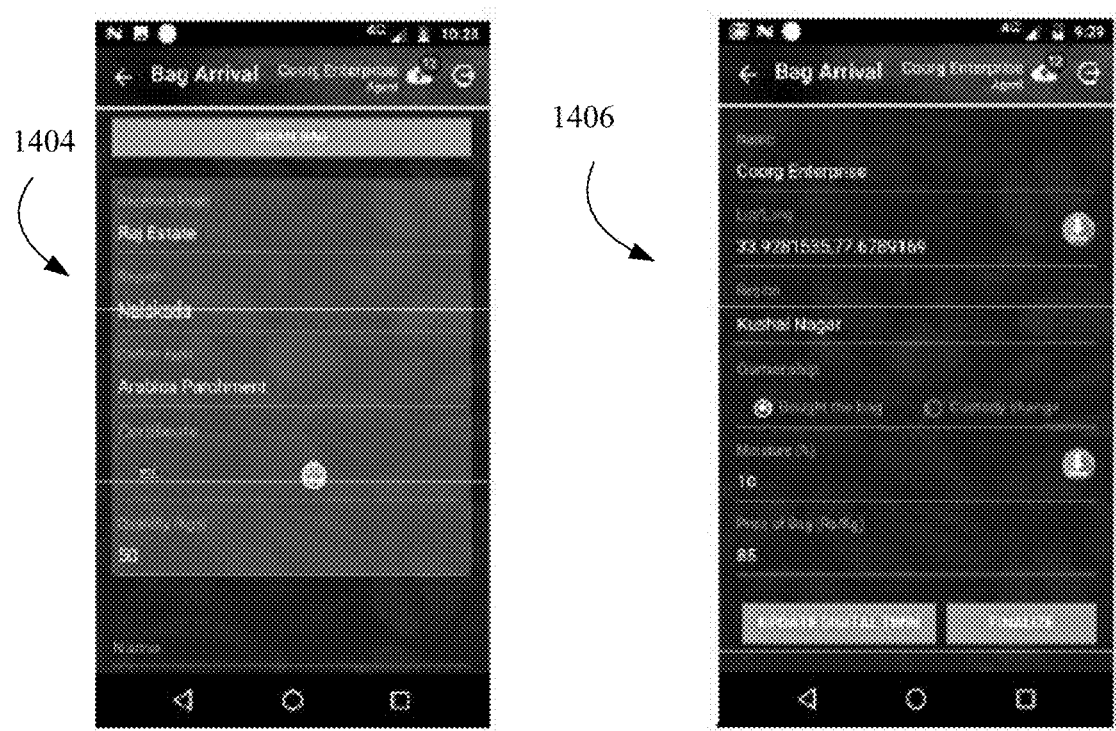
Figure 15:
Figure 15:
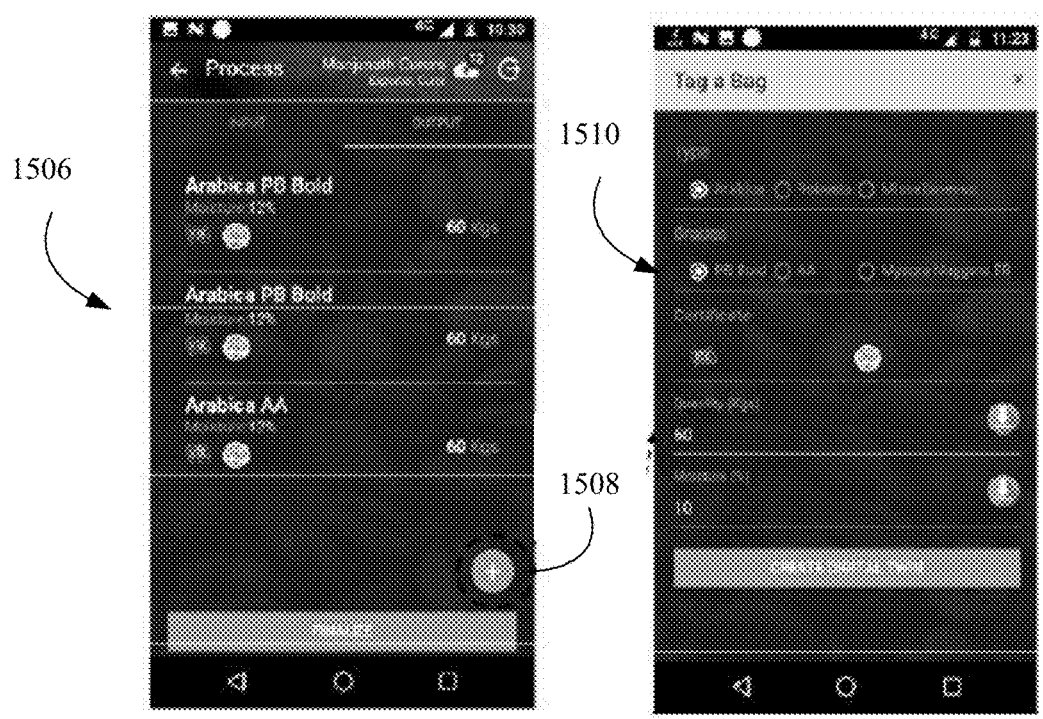

FIG. 15(a) illustrates a graphical user interface 1500 at state transformation (e.g., final processing) of the bag described with respect to FIGS. 13-14. The graphical user interface 1500 may be implemented by a computing device. A user may select "aggregate tag bag" as indicated by 1502. After selection of aggregate tag bag 1502, input entry screens 1504, 1506 may be displayed at FIGS. 15(b)-15(c), to provide input data for the bag. The bag, in particular the digital twin of the bag, may be scanned to populate some data and also link input entry screens 1504, 1506 to the blockchain and digital twin.

Several or all fields (e.g., latitude, longitude, name etc.) may be filled out automatically through sensors of the computing device and/or previous historical experience saved by the computing device. As noted above, the input data may be authenticated. Further, the input entry screen 1504 may display information obtained from the digital twin and entered at the entry and custody change levels, such as the type of coffee, transit origination point, and the production origination point. Input entry screen 1506 is a continuation of input entry screen 1504. The user may actuate button 1508 to bring up input entry screen 1510 of FIG. 15(d). The user may update the digital twin and update the blockchain to contain the input data and authentication scores of the input data.

Figure 16:
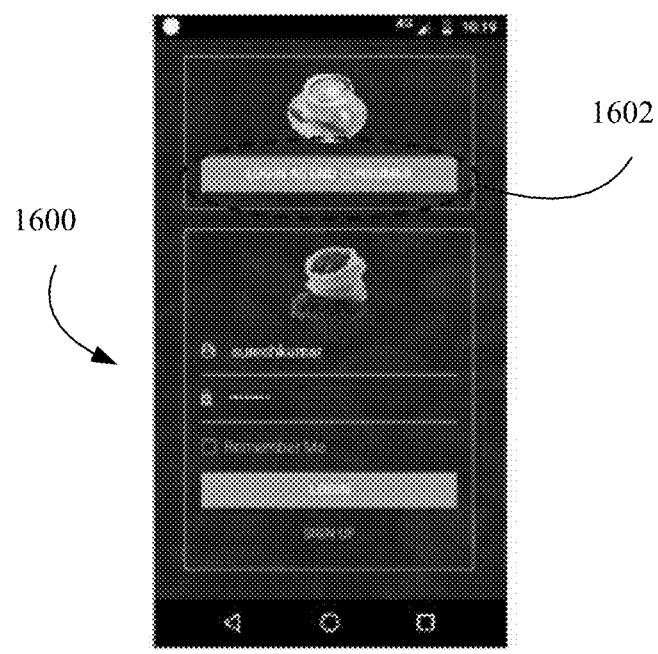
Figure 16:
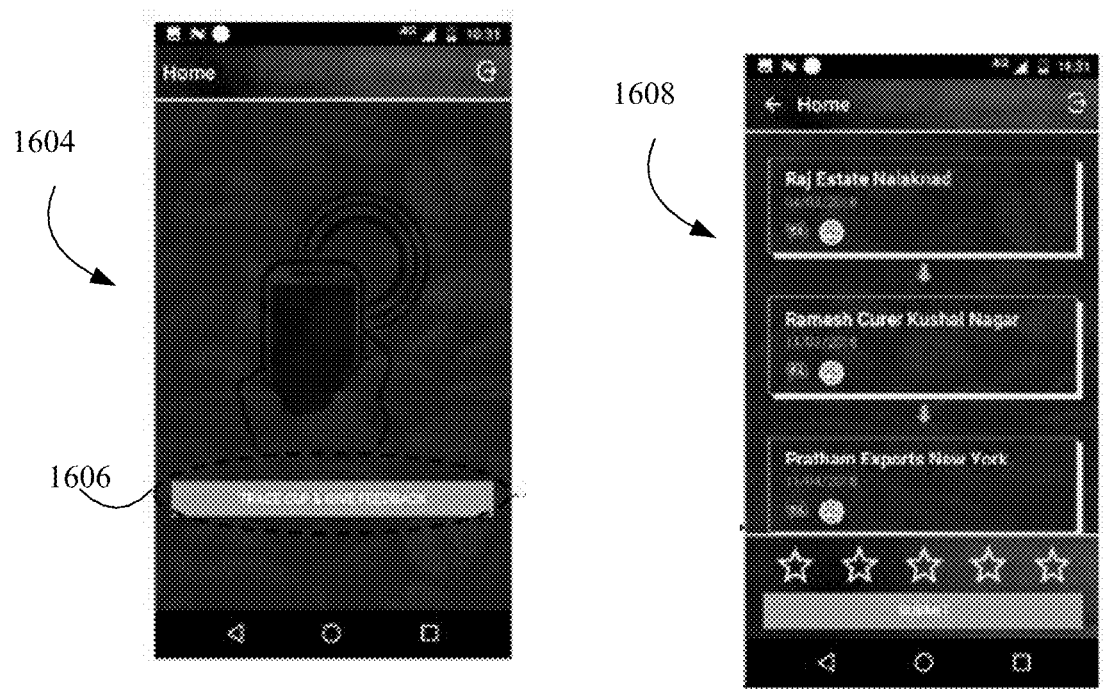

FIG. 16(a) illustrates a graphical user interface 1600 at the end point (end consumer) of the product. The graphical user interface 1600 may be implemented by a computing device. A user may select "login as an end consumer" as indicated by 1602. After selection of login as an end consumer 1602, product display screen 1604 may be displayed as illustrated by FIG. 16(b) so that the user may view data for coffee contained in the bag. As illustrated, the user may actuate button 1606 to trace a cup of the coffee. Once the button 1606 is actuated, screen 1608 of FIG. 16(c) may be displayed so that the user may quickly scan and verify the history of the coffee, and the authentication scores.

The flowchart and block diagrams in the Figures illustrate the architecture, functionality, and operation of possible implementations of systems, methods and computer program products according to various exemplary embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The methods shown herein may generally be implemented in a computing device or system. The computing device or system may be a user level device or system or a server-level device or system. More particularly, the methods may be implemented in one or more modules as a set of logic instructions stored in a machine or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the methods of FIGS. 3 and 7 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, and/or other structural components that are native to hardware (e.g., host processor, central processing unit/CPU, microcontroller, etc.).

Example sizes/models/values/ranges may have been given, although embodiments are not limited to the same. Where specific details are set forth in order to describe example embodiments, it should be apparent to one skilled in the art that embodiments can be practiced without, or with variation of, these specific details. The description is thus to be regarded as illustrative instead of limiting.

Those skilled in the art will appreciate from the foregoing description that the broad techniques of the one or more embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An authentication system, comprising:
a storage device to store authentication data, wherein the authentication data is determined by previous authentications of a plurality of products; and
an authentication device coupled to the storage device and one or more remote data sources that store remote data, the authentication device including:
a display to present a graphical user interface to receive a user input related to a first product;
one or more sensors configured to detect sensor data, wherein the sensor data is related to the first product;
an external sensor interface configured to receive environmental data from one or more remote sensors, wherein the environmental data is associated with production of the first product; and
a processor coupled to the one or more sensors and the display, the processor to execute a current authentication of the first product based on one or more of the sensor data or the user input, wherein to execute the current authentication, the processor is to:
identify the first product based on the one or more of the sensor data or the user input;
identify whether the current authentication matches or is identical to one or more of the previous authentications based on whether the first product matches or is identical to one or more of the plurality of products;
in response to the current authentication being identified as not matching or being identical to the one or more of the previous authentications, automatically identify the remote data from the one or more remote data sources, and automatically authenticate the first product based on:
a first comparison of the remote data to one or more of the user input or the sensor data, and
a second comparison of a predicted amount of the first product to an input amount of the first product identified from the user input or the sensor data, wherein the predicted amount is predicted based on the environmental data; and
in response to the current authentication being identified as matching or being identical to the one or more of the previous authentications, automatically authenticate the first product according to the authentication data from the storage device,
the system further comprising a plurality of remote sensors that is remote to the authentication device and communicatively coupled to the authentication device, wherein the plurality of remote sensors includes the one or more remote sensors,
wherein the processor is further configured to:
identify remote sensor data from one or more remote sensors that are a subset of the plurality of remote sensors; and
when the current authentication is identified as not matching or being identical to the one or more of the previous authentications, authenticate the first product according to the remote sensor data.

2. The system of claim 1, wherein:
the storage device is configured to provide the authentication data to the authentication device;
the authentication device includes a local storage that stores the authentication data received from the storage device, wherein the authentication data includes an authentication score associated with the one or more of the plurality of products;
and
to execute the current authentication, the processor assigns the authentication score to one or more features identified from the sensor data or the user input.

3. The system of claim 1, wherein the external sensor interface is configured to:
identify for each respective sensor among the plurality of remote sensors, a measurement of a communication strength between the authentication device and said each respective sensor; and
identify the one or more remote sensors among the plurality of remote sensors based on the measurement of the communication strength between the authentication device and said each respective sensor.

4. The system of claim 1, wherein the processor is configured to:
identify a plurality of remote data sources that each has a capability to conduct a verification of one or more of the sensor data or the user input to authenticate the first product, wherein the plurality of remote data sources includes the one or more remote data sources;
identify a first response time of the one or more remote data sources as being shorter than a second response time of at least one other of the plurality of remote data sources;
identify the one or more remote data sources from the plurality of remote data sources in response to the first response time being identified as being shorter than the second response time; and
when the current authentication is identified as not matching or being identical to the one or more of the previous authentications, receive the remote data from the one or more remote data sources but not the at least one other of the plurality of remote data sources.

5. An apparatus comprising:
an interface to receive sensor data from one or more sensors and receive environmental data from one or more remote sensors, wherein the environmental data is associated with production of a first product and the sensor data is related to the first product; and
a processor communicatively coupled to a storage device and the interface, the processor to execute a current authentication of the first product based on the sensor data, wherein the storage device is to store authentication data that is determined by previous authentications of a plurality of products, further wherein to execute the current authentication, the processor is to:
identify the first product based on the sensor data;
identify whether the current authentication matches or is identical to one or more of the previous authentications based on whether the first product matches or is identical to one or more of the plurality of products;
in response to the current authentication being identified as not matching or being identical to the one or more of the previous authentications, automatically identify remote data from one or more remote data sources, and automatically authenticate the first product based on:
a first comparison of the remote data to the sensor data, and
a second comparison of a predicted amount of the first product to an input amount of the first product identified from the sensor data, wherein the predicted amount is predicted based on the environmental data; and
in response to the current authentication being identified as matching or being identical to the one or more of the previous authentications, automatically authenticate the first product according to the authentication data from the storage device,
wherein a plurality of remote sensors is remote to the apparatus and communicatively coupled to the apparatus, wherein the plurality of remote sensors includes the one or more remote sensors; and the processor is to:
identify remote sensor data from one or more remote sensors that are a subset of the plurality of remote sensors; and
when the current authentication is identified as not matching or being identical to the one or more of the previous authentications, authenticate the first product according to the remote sensor data.

6. The apparatus of claim 5, wherein:
the authentication data includes an authentication score associated with the one or more of the plurality of products; and
to execute the current authentication, the processor assigns the authentication score to one or more features identified from the sensor data.

7. The apparatus of claim 5, wherein the interface is to:
identify for each respective sensor among the plurality of remote sensors, a measurement of a communication strength between the apparatus and said each respective sensor; and
identify the one or more remote sensors among the plurality of remote sensors based on the measurement of the communication strength between the apparatus and said each respective sensor.

8. The apparatus of claim 5, wherein the processor is configured to:
identify a plurality of remote data sources that each has a capability to conduct a verification of the sensor data to authenticate the first product, wherein the plurality of remote data sources includes the one or more remote data sources;
identify a first response time of the one or more remote data sources as being shorter than a second response time of at least one other of the plurality of remote data sources;
identify the one or more remote data sources from the plurality of remote data sources in response to the first response time being identified as being shorter than the second response time; and
when the current authentication is identified as not matching or being identical to the one or more of the previous authentications, receive the remote data from the one or more remote data sources but not the at least one other of the plurality of remote data sources.

9. A method comprising:
identifying a storage device that stores authentication data, wherein the authentication data is determined by previous authentications of a plurality of products;
receiving sensor data from one or more sensors, wherein the sensor data is related to a first product;
receiving environmental data from one or more remote sensors, wherein the environmental data is associated with production of the first product;
executing a current authentication of the first product based on the sensor data and at an authentication device, the executing including:
identifying the first product based on the sensor data;
identifying whether the current authentication matches or is identical to one or more of the previous authentications based on whether the first product matches or is identical to one or more of the plurality of products;
in response to the current authentication being identified as not matching or being identical to the one or more of the previous authentications, automatically identifying remote data from one or more remote data sources, and automatically authenticating the first product based on:
a first comparison of the remote data to the sensor data, and
a second comparison of a predicted amount of the first product to an input amount of the first product identified from the sensor data, wherein the predicted amount is predicted based on the environmental data; and
in response to the current authentication being identified as matching or being identical to the one or more of the previous authentications, automatically authenticating the first product according to the authentication data;
identifying a plurality of remote sensors that is remote to the authentication device and communicatively coupled to the authentication device, wherein the plurality of remote sensors includes the one or more remote sensors;
identifying remote sensor data from one or more remote sensors that are a subset of the plurality of remote sensors; and
when the current authentication is identified as not matching or being identical to the one or more of the previous authentications, authenticating the first product according to the remote sensor data.

10. The method of claim 9, wherein:
the authentication data includes an authentication score associated with the one or more of the plurality of products; and
the authenticating the first product according to the authentication data includes assigning the authentication score to one or more features identified from the sensor data.

11. The method of claim 9, further comprising:
identifying for each respective sensor among the plurality of remote sensors, a measurement of a communication strength between the authentication device and said each respective sensor; and
identifying the one or more remote sensors among the plurality of remote sensors based on the measurement of the communication strength between the authentication device and said each respective sensor.

12. The method of claim 9, further comprising:
identifying a plurality of remote data sources that each has a capability to conduct a verification of the sensor data to authenticate the first product, wherein the plurality of remote data sources includes the one or more remote data sources;
identifying a first response time of the one or more remote data sources as being shorter than a second response time of at least one other of the plurality of remote data sources;
identifying the one or more remote data sources from the plurality of remote data sources in response to the first response time being identified as being shorter than the second response time; and
when the current authentication is identified as not matching or being identical to the one or more of the previous authentications, receiving the remote data from the one or more remote data sources but not the at least one other of the plurality of remote data sources.

13. A non-transitory computer readable medium comprising a set of instructions, which when executed by one or more processors of an authentication device, cause the one or more processors to:
identify a storage device that stores authentication data, wherein the authentication data is determined by previous authentications of a plurality of products;
receive sensor data from one or more sensors, wherein the sensor data is related to a first product;
receive environmental data from one or more remote sensors, wherein the environmental data is associated with production of the first product;
execute a current authentication of the first product based on the sensor data and at the authentication device, wherein the execute is to include:
an identification of the first product based on the sensor data;
an identification of whether the current authentication matches or is identical to one or more of the previous authentications based on whether the first product matches or is identical to one or more of the plurality of products;
in response to the current authentication being identified as not matching or being identical to the one or more of the previous authentications, an automatic identification of remote data from one or more remote data sources, and an automatic authentication of the first product based on:
a first comparison of the remote data to the sensor data, and
a second comparison of a predicted amount of the first product to an input amount of the first product identified from the sensor data, wherein the predicted amount is predicted based on the environmental data; and
in response to the current authentication being identified as matching or being identical to the one or more of the previous authentications, automatically authenticate the first product according to the authentication data;
wherein the one or more processors further are to:
identify a plurality of remote sensors that is remote to the authentication device and communicatively coupled to the authentication device, wherein the plurality of remote sensors includes the one or more remote sensors;
identify remote sensor data from one or more remote sensors that are a subset of the plurality of remote sensors; and
when the current authentication is identified as not matching or being identical to the one or more of the previous authentications, authenticate the first product according to the remote sensor data.

14. The non-transitory computer readable medium of claim 13, wherein:
the authentication data includes an authentication score associated with the one or more of the plurality of products;
and
the authentication of the first product according to the authentication data includes an assignment of the authentication score to one or more features identified from the sensor data.

15. The non-transitory computer readable medium of claim 13, wherein the one or more processors are to:
identify for each respective sensor among the plurality of remote sensors, a measurement of a communication strength between the authentication device and said each respective sensor; and
identify the one or more remote sensors among the plurality of remote sensors based on the measurement of the communication strength between the authentication device and said each respective sensor.

16. The non-transitory computer readable medium of claim 13, wherein the one or more processors are to:
identify a plurality of remote data sources that each has a capability to conduct a verification of the sensor data to authenticate the first product, wherein the plurality of remote data sources includes the one or more remote data sources;
identify a first response time of the one or more remote data sources as being shorter than a second response time of at least one other of the plurality of remote data sources;
identify the one or more remote data sources from the plurality of remote data sources in response to the first response time being identified as being shorter than the second response time; and
when the current authentication is identified as not matching or being identical to the one or more of the previous authentications, receive the remote data from the one or more remote data sources but not the at least one other of the plurality of remote data sources.

* * * * *